(12) United States Patent
Davis et al.

(10) Patent No.: US 12,547,045 B2
(45) Date of Patent: Feb. 10, 2026

(54) REMOTE COLOR MATCHING DEVICES AND SYSTEM

(71) Applicants: Dennis Willard Davis, Palm Bay, FL (US); Alice McKinstry Davis, Palm Bay, FL (US); Adam Michael Phenis, Poway, CA (US)

(72) Inventors: Dennis Willard Davis, Palm Bay, FL (US); Alice McKinstry Davis, Palm Bay, FL (US); Adam Michael Phenis, Poway, CA (US)

( * ) Notice: Subject to any disclaimer, the term of this patent is extended or adjusted under 35 U.S.C. 154(b) by 228 days.

(21) Appl. No.: 18/380,179

(22) Filed: Oct. 15, 2023

(65) Prior Publication Data

US 2024/0045302 A1 Feb. 8, 2024

Related U.S. Application Data

(63) Continuation-in-part of application No. 17/242,897, filed on Apr. 28, 2021, now Pat. No. 11,830,456.

(51) Int. Cl.
*G02F 1/23* (2006.01)
*H05B 47/10* (2020.01)

(52) U.S. Cl.
CPC .............. *G02F 1/23* (2013.01); *H05B 47/10* (2020.01)

(58) Field of Classification Search
CPC ............ G02B 27/283; G02F 1/03; G02F 1/23
See application file for complete search history.

(56) References Cited

U.S. PATENT DOCUMENTS 8,203,756 B2 * 6/2012 Edge .................... H04N 1/6052
358/1.9
2014/0028699 A1 * 1/2014 Kurtz ...................... G09G 5/02
345/590

FOREIGN PATENT DOCUMENTS

WO    WO-2010100568 A2 *  9/2010  .............. G01J 3/463

OTHER PUBLICATIONS

Yamaguchi, Masahiro & Haneishi, Hideaki & Ohyama, Nagaaki. (2008). Beyond Red-Green-Blue (RGB): Spectrum-Based Color Imaging Technology. Journal of Imaging Science and Technology—J Imaging Sci Technol. 52. 10.2352/J. ImagingSci. Technol. (2008)52:1(010201). (Year: 2008).*

* cited by examiner

*Primary Examiner* — Antonio A Caschera

(57) ABSTRACT

The invention comprises a method and system for cost effective, convenient remote high fidelity color reproduction and matching that can be used to convey color to observers remote from the physical source of color. Such remote observers can include product consumers wishing to view a product color, for example. In a preferred embodiment, the method comprises capture of article or product reflectance spectra and the use of this spectrum to filter ambient light or directed light in the environment of a user remote from the article or product. Other embodiments of methods include various techniques to capture product spectral information and color matching functions useful for color reproduction using colored light sources. Additional systems embodiments include devices exploiting multiprimary displays to render the product color with reduced metamerism.

10 Claims, 25 Drawing Sheets

REMOTE COLOR MATCHING DEVICES AND SYSTEM

CROSS-REFERENCE TO RELATED APPLICATIONS

This patent application claims the benefit of U.S. Provisional Ser. No. 62/708,073 filed Dec. 1, 2017 and is a continuation-in-part application of U.S. patent application Ser. No. 17/242,897 filed Apr. 28, 2021 which is a continuation-in-part of U.S. patent application Ser. No. 16/350,553 filed Nov. 30, 2018 which claims priority benefit of non-provisional U.S. Patent Application Ser. No. 62/708,073 filed Dec. 1, 2017. All of the above applications are incorporated by reference herein.

BACKGROUND

There are numerous applications for remote high fidelity reproduction of color. In order to achieve such reproduction, attention must be given to illumination spectra, the variation of the human visual response to color as well as metameric, and other effects that occur in human vision.

Color reproduction is a daunting challenge in the remote display of product colors. Often, online and print (catalog) depictions of product colors are insufficient to render the same color as perceived by the consumer upon direct inspection of the given product. According to Invesp Infographic regarding online return rates statistics, at least 30% of all products ordered online are returned compared to only 8.89% bought in brick-and-mortar shops (https://www.business2community.com/infographics/e-commerce-product-return-statistics-trends-infographic-01505394). Some significant contribution to these returns in the case of apparel and shoes are product colors that are deemed unsatisfactory by the consumer.

Currently, domestic shopping through online retail stores comprises only about 10 percent of consumer activity, but this percentage is slated to increase in the coming years. For consumers making online purchases, one of the key product features that could benefit from improved specification is color. This capability would extend to product sales on Ebay or Etsy wherein the general public could determine an item's color for posting with the item for sale.

In addition to the problem of accurate reproduction of product colors for the consumer, it remains challenging for the consumer to match the color of an advertised product to the color of an item in the consumer's possession. Many variables contribute to the difficulty in high fidelity reproduction of color as well as in color matching. Among these are:
  Variable illumination
  Observation angle
  Observer metamerism
  Spectral matching versus colorimetric matching—lack of spectral resolution
  Background
  Textures
  Temperatures Hence, it would be advantageous for a method and associated system that would overcome these most critical of these issues and present a high fidelity remote representation of the true article or product color. Foundational to development of such technology is an assessment of the details concerning how color is defined and perceived by humans.

Quantifying Color

The classical descriptive mechanism for accurately defining the relationship between the wavelength(s) of a color and the perceived effect on the human eye is a color space. This construct also permits color comparisons between displays that exhibit different ways they display color, i.e. color profiles.

Color Spaces

Color descriptions are predicated on either additive or subtractive color theory; the former for transmitted light (ex. electronic displays) the latter for reflected light (printed materials and paints).

A color space describes an abstract, multidimensional environment in which any particular color can be defined. A color model is a geometric or mathematical framework that attempts to describe the colors humans perceive. It uses numerical values pinned to dimensions of the model to represent the visible spectrum of color. A color model provides a method for describing, classifying, comparing, and ordering colors.

Further, a color space is a practical adaptation of a color model that specifies a gamut of colors that can be produced using that model. The color model determines the relationship between values, and the color space defines the absolute meaning of those values as colors. These values, called components, are in most instances floating-point values between 0.0 and 1.0 (introduction to Color Programming Topics for Cocoa, Apple Programming Guide).

There are five major color models or spaces that subdivide into others, these are: CIE, RGB, YUV, HSL/HSV, and CMYK; the latter being a subtractive color model applicable to printing. These standardized color description systems are used to quantify color and permit consistent production of print, paint, and video display colors. Transformation among these different color spaces is achievable mathematically (Adrian Ford and Alan Roberts, Color Space Conversions, Aug. 11, 1998, http://www.wmin.ac.uk/ITRG/docs/coloreq.html, page 1-31.).

Reference is made to FIG. 1, which depicts the 1931 Commission internationale de l'éclairage (CIE) Chromaticity diagram as a representation of a color space encompassing all humanly discernable colors.

The XYZ chromaticity diagram is a standard color space, independent of any choice of primaries, in which the color of any object or light can be specified, independent of its total reflectance or brightness. The horseshoe-shaped perimeter of this space corresponds to all saturated colors, i.e. single wavelength (pure) colors. It can be said that as a trajectory is traced inward from these perimeter coordinates, the effective optical bandwidth of the light represented by the coordinates increases and becomes unsaturated (impure). In accordance with Grassman's Laws of Additive Color Mixture, primary colors selected on this diagram establish a polygon wherein any color enclosed in the respective polygon can be generated with the appropriate intensity weighted combination of the primary colors. The space of colors that can be synthesized by a set of primary colors is called the gamut.

FIG. 2 depicts the color gamut enclosed by the dotted triangle 1, using red 5, green 3, and blue 7 primary colors inherent is various display and reflective systems. FIG. 3 depicts expansion of the color gamut 11 through use of a greater plurality of primaries, 13, 15, 17, 19, and 21. Again, it should be emphasized that primaries whose coordinates are located on the perimeter of the chromaticity diagram are single wavelength (fully saturated). Such saturated primaries could be approximated by laser sources with very narrow bandwidths. As the coordinates of a primary approach the center of the diagram, the primary is of increasing optical bandwidth (unsaturated). The very center of the diagram represents the most unsaturated color—white, encompassing all visible wavelengths.

Visual Response

In the XYZ color space, the Y coordinate represents luminance (measured intensity). It is useful to transform this space to an Yxy color space in which the Y coordinate remains representative of luminance, and where x represents hue, and y represents saturation.

XYZ tristimulus values and the associated Yxy color space form the foundation of present CIE color spaces which are widely used for color comparison. The concept for the XYZ tristimulus values is based on the three-component theory of color vision, which states that the eye possesses receptors for three primary colors (red, green, and blue) and that all colors are seen as mixtures of these three primary colors. The XYZ tristimulus values are calculated using these CIE Standard Observer color matching functions (CMFs) $\bar{x}(\lambda)$, $\bar{y}(\lambda)$, $\bar{z}(\lambda)$, as depicted in the FIG. 4.

These functions represent the spectral response (across the visible spectrum from 380 nm to 780 nm) of the three types of cone photoreceptors in the eye and have been generated as an ensemble average across a population of individuals.

The Commission International de l'Eclairage (CIE) has documented CMFs for two different categories of standard observers: a 2 degree 1931 CIE standard observer and a 10 degree 1964 CIE standard observer. These matching functions are ensemble averages across a population of normal observers using viewing conditions that vary emphasis on the foveal response. In FIG. 5, a plot of RGB CMFs, the variation of response from observer to observer is illustrated by the spread in response across a particular ensemble of 49 observers. (Stiles, W. S., & Burch, J. M., "NPL color-matching investigation: Final report", Optica Acta, 6, 1-26, 1959.)

The Yxy encoding is a very good color space solution due to its strong physical/perceptual background. One can go from RGB color space to XYZ (selecting a certain color-space transform matrix), and then go from XYZ to Yxy using the following formulas:

$$x = X/(X + Y + Z)$$
$$y = Y/(X + Y + Z)$$
$$X = K \int_{380}^{780} S(\lambda)\bar{x}(\lambda)R(\lambda)d\lambda$$
$$Y = K \int_{380}^{780} S(\lambda)\bar{y}(\lambda)R(\lambda)d\lambda$$
$$Z = K \int_{380}^{780} S(\lambda)\bar{z}(\lambda)R(\lambda)d\lambda$$
$$K = \frac{100}{\int_{380}^{780} S(\lambda)\bar{y}(\lambda)R(\lambda)d\lambda}$$

Where $S(\lambda)$: Relative spectral power distribution of the illuminator $\bar{x}(\lambda)$, $\bar{y}(\lambda)$, $\bar{z}(\lambda)$: Color-matching functions for CIE 2° Standard Observer (1931)

$R(\lambda)$: Spectral reflectance of specimen The CIE chromaticity diagram is generated by plotting the average CMFs in the x,y coordinates.

In the Yxy color space, Y remains the luminance and independent of luminance, the x and y coordinates represent hue and saturation respectively. Other color spaces have been defined that are linear transformations of the CIE 1931 color space. For quantifying color differences, a more uniform color space with u', v' coordinates was derived; in the associated coordinates $\Delta u'v' \leq 0.002$ is assessed as change that is visually undiscernible to humans.

While the 1931 x, y chromaticity diagram is accepted and used widely in the field of color science, there are a few fundamental flaws. One of the major problems is the non-uniformity of the diagram. A certain geometric distance in, for example, the green part of the diagram does not represent an equal perceived difference in color as the same distance does in the blue part of the diagram. In 1942, MacAdam (MacAdam, D. L., "Visual Sensitivities to Color Differences in Daylight", Journal of the Optical Society of America, 32(5), 247, 1942.) did a series of color matching experiments to determine the just noticeable differences (JND) of chromaticity. MacAdam shows the resulting JND plotted in the x, y color space are in fact ellipses with widely varying size depending on their location in the chromaticity diagram. In FIG. 6, these ellipses are plotted in the x,y color space, but enlarged 10 times for ease of viewing. It is apparent that perceivable color differences and geometrical distances between color coordinates depend on the location in the diagram itself (W. Hertog, "The design and implementation of a spectrally tunable LED-based light source: towards a new era of intelligent illumination", PhD Thesis, Department of Optics and Optometry of the Universitat Politècnica de Catalunya, December 2016).

To achieve a sense of human visual sensitivity to wavelength changes across the visible spectrum, reference is made to FIG. 7. This is a plot of JNDs in color across the visible spectrum for saturated light (Krudy A, Ladunga K, "Measuring wavelength discrimination threshold along the entire visible spectrum", Period Polytech Mech Eng 45, 2001, pp. 41-48.). It is apparent that variation in wavelength between light sources as small as 2 nm can be detected.

In quantizing the intensity of lighting, gamma encoding of images is used to optimize the usage of bits when encoding an image, or bandwidth used to transport an image, by taking advantage of the non-linear manner in which humans perceive light and color. The human perception of brightness, under common illumination conditions (not extremes), follows an approximate exponential power function with greater sensitivity to relative differences between darker tones than between lighter ones, consistent with the Stevens' power law for brightness perception. If images are not gamma-encoded, they allocate too many bits or too much bandwidth to highlights that humans cannot differentiate, and too few bits or too little bandwidth to shadow values that humans are sensitive to and would require more bits/bandwidth to maintain the same visual quality. Gamma encoding of floating-point images is not required (and may be counterproductive), because the floating-point format already provides a piecewise linear approximation of a logarithmic curve. In the present application that involves single pixel display for color matching, gamma encoding is not required.

It is important to recognize that color perception is a psycho-visual phenomenon, so certain viewing conditions must be under control to achieve consistent color reproduction at the stage of human perception.

Metamerism

Two or more stimuli having identical chromaticity coordinates, but a different spectrum, are called metamers. The stimuli can be either light sources or objects reflecting or transmitting a certain illumination spectrum. Metamerism exists because the retinal cones are tristimulus receptors, which means that for one set of chromaticity coordinates there are an infinite number of matching spectra. Metameric failure occurs when a change of the illuminant spectrum, the observer, the field-of-view or the angle-of-view causes a change in color coordinates (W. Hertog, "The design and implementation of a spectrally tunable LED-based light source: towards a new era of intelligent illumination", PhD Thesis, Department of Optics and Optometry of the Universitat Politcnica de Catalunya, December 2016).

There are multiple potential causes for metamerism. Illuminant metameric failure occurs when a change in the illuminant causes a difference in chromaticity between two items viewed under that light source. Observer metameric failure is caused by the difference in the visual system between 2 observers. Color perception among color normal observers varies depending on pre-retinal filtering in the optical media (cornea, lens, and humors), macular photo pigment density, cone distribution differences, color neural processing differences, and differences in cone spectral sensitivity. This cause of metamerism is underscored by reference to FIG. 5 depicting the variation in CMFs across multiple observers.

Field-of-view metameric failure occurs when a stimulus is viewed with the central fovea, due to a difference in concentration in cones, the color sensation is slightly different than when the same stimulus is registered outside the central foveal region of the retina.

Angle-of-view metameric failure occurs depending on the gloss and other gonio-dependant characteristics of certain materials as the chromaticity changes depending on the viewing angle.

Given control over the color reproduction environment in the currently disclosed method and system, the two forms of metamerism considered most important are illuminant and observer metamerism. Approaches to mitigation of metamerism are addressed below in the Detailed Description.

Color Gamut Limitations

Some article or product colors cannot be rendered on conventional RGB displays given that the article or product color spectrum resides outside the gamut of the display. Also, printer gamuts are considerably smaller than display gamuts; this is an inherent limitation in print catalog representations of product colors.

PRIOR ART

Relevant prior art includes optical spectral sensors, color displays, and color matching methodologies.

Sensors

Optical instruments used to measure color include spectrometers and colorimeters.

Spectrometers measure the continuum spectrum of light being sensed, whereas colorimeters typically are designed to output the light intensity captured by RGB CMFs (Most often, standard CMFs are used.). Additionally relevant are spectral dispersion technologies used in optical pulse compression.

In a spectrometer, light is either refracted or diffracted to spatially distribute the different wavelengths of a light source (whether reflected or emitted) across a detector array, whereby the intensity of light at a particular wavelength (or small spread of wavelengths) is captured on a single detector. In this way the continuum spectrum of the given light is measured.

Spectrometric measurement is divorced from the issues surrounding human perception of color and any associated ambiguities (such as metamerism) because the entire color spectrum is measured. Colorimeters use calibrated illumination and color filters that mimic the spectral profile of human CMFs to provide three (RGB) integrated color values.

Colorimeters such as Color Muse, Nix Mini Color Sensor, and models by X-rite have been marketed to consumers for color matching applications. The following features are advertised for Color Muse:
  Built in illumination source
  Constant illumination and viewing angle
  Constant "observer"
  Elimination of area effect and contrast effect
  Color difference measurement However, in the present application, spectrometers are the favored color measurement device in order to avoid observer metamerism. High end spectrometers exhibit exquisite spectral resolution, but lower cost devices can be used to achieve spectral resolution on the order of a nanometer.

Optical detectors of importance include integrated multi-spectral sensors, most notably, those vended by Austria Micro Systems (AMS) (previously manufactured by MAZeT GmbH). These sensors are fabricated from multiple dielectric filters rendered in a single miniature package with electronic interface. Such devices are useful for closed-loop wavelength control of LEDs.

Displays

Color display displays include commercial solid state devices such as those associated with smartphones, tablet computers, and monitors for computer, entertainment, and industrial applications. Also, luminaire technology used for colored light illumination is relevant.

Important considerations are the number and saturation level of the primaries used in the display as this will determine the color gamut that can be displayed. The core LED technology underpinning many of these display devices is of paramount importance. Among critical LED parameters are optical bandwidths, wavelength availability and stability with temperature and drive current, and flux levels. Significant performance improvements in LED and associated LCD technology have occurred in recent years.

Color Matching Methods

Prior art additive color matching methods are most relevant to the present application given the emphasis on active display of reproduced color. In this context, the many variants of color monitor calibration used in work flow protocols within the graphic arts and publishing industries are important. Many of these methods involve software hosted on monitors that is used in concert with colorimeters or spectrometers. Characterization of color reproduction devices is achieved with device profiles; exemplary is U.S. Pat. No. 8,246,408.

The most widely used profiles are those of the International Color Consortium (ICC). These permit correct color reproduction when images are input from a scanner or camera and displayed on a monitor or printed. They define the relationship between the digital representations of color information the device receives or transmits and a standard color space defined by ICC and based on a measurement system defined internationally by CIE. Thus, a profile can be available for a scanner, camera, display and printer; the fact that they refer to a standard color space permits their combination in a workflow so that the correct color is maintained from imaging to display or printing.

An ICC profile is one that conforms to the ICC specification. By conforming to this specification profiles may be exchanged and correctly interpreted by other users. The two main types of profiles are source (input) and destination (output) profiles and essentially consist of tables of data that relate the device chromaticity co-ordinates to those of the standard color space defined by ICC. There are various relationships defined in each profile (known as rendering intents). Special types of profiles (devicelink, and abstract) are defined for special workflow applications.

Metamerism Reduction Various prior art methods of reducing observer metamerism can be cited, among these include increasing the bandwidth of primaries, selecting specific red, green, and blue wavelengths, use of more than three primaries, and a method for observer-dependent color imaging wherein the color workflow is tuned to match one of several observer classes. In the latter case, means to assign an observer to such classes can be physiologically based. Noteworthy is U. S. Patent Application Publication Number 20140028698 which discloses applying a metamerism correction transform to a input color image to determine an output color image in an output color space appropriate for display on the color display device, the output color image having a plurality of output color channels, each of the output color channels being associated with one of the device color primaries, wherein the metamerism correction transform modifies colorimetry associated with the input colors to provide output color values such that an average observer metameric failure is reduced for a distribution of target observers.

SUMMARY OF THE INVENTION

There are well developed technologies that can be used to specify colors in quantitative fashion and reproduce such colors by active display means. For color measurement and quantification, spectrometers or colorimeters can generate a quantitative, reproducible description of any particular color when observed under controlled illumination. In the spectrally accurate display of color, illumination sources such as LEDs and OLEDs can provide display primaries for additive color synthesis that can be wavelength controlled.

What is needed is a viable, cost effective, convenient method for remote color reproduction and matching that can be used by product vendors and consumers as well as other parties interested in high fidelity remote reproduction of color. More particularly, to be sought is a method and system that permits color identification and matching for articles or products that are not locally observable by an interested party. Presently disclosed is a business method and system to achieve these objectives. The method involves actions taken by both a first party, such as a product vendor and a second party, a user remote from the first party, such as a consumer. In this method, the vendor will use a sensor to capture product spectral color information under controlled illumination conditions. This spectral information would be communicated with prospective consumers. Such information can be digitized and coded for publication online or in printed material associated with the given product. More particularly, spectral information can be published on a website that can be electronically downloaded then uploaded into a display device or manually entered in a display device. This spectral information can be coded for data compression. In the case of electronic transfer of data, a compressed data file can be uploaded into the display device and decoded for use by the display device. The data also can be emailed for such use.

The remote user (ex. consumer) either would upload this information into a compact display that would provide a high fidelity rendering of the actual article or product color or could use a display (smartphone, tablet, or monitor) calibrated to the remote user's visual response. Variations on this method include different approaches to mitigate observer metamerism which otherwise would cause failure to render colors with fidelity adequate that the typical consumer or other remote user would consider the color rendition matches the original color.

A first such approach to diminish observer metamerism comprises the calibration of displays to be used by a consumer for product color reproduction. Such calibration would be performed against measured user CMFs. A second approach makes use of a multi-primary display exhibiting spectral match to the product spectrum under colorimetric constraints. The colorimetric constraint comprises either a match to standard CMFs, such as CIE 1931 CMFs, or to the measured remote user's CMFs. A third approach, which totally circumvents metamerism, utilizes an adaptive spectral filter to filter the user's ambient light with the reflectance spectrum of the colored article in question. Hereinafter, the use of the terminology "reflectance spectrum" refers to the reflectance spectrum of an article or product.

In the system to support implementation of these methods, a spectral sensor would be employed by the vendor of the colored product in the form of a colorimeter or spectrometer with digital output, and a portable display would be used by the consumer to render the product spectral color information published by the vendor.

The consumer display can be a smartphone, color tablet, color monitor, or a compact, handheld monocular or binocular device, after the fashion of a virtual reality headset. Different embodiments of this latter device use a) either several illumination primaries (multiprimaries) to reproduce the color spectrum of the product or b) spectrally modulate ambient light with the article or product spectrum. In the multiprimary implementation, blocking ambient light would eliminate color perception issues associated with ambient and background light. Additionally, as stated, some embodiments of the method require measurement of the consumer's CMFs. The functionality to perform such measurements can be instantiated as a standalone compact portable device or can be incorporated into the aforementioned monocular or binocular display device.

Below is a lexicon of terms used in this disclosure to support the meaning of the specification and to clarify interpretation of the appended claims.

Definitions

Ambient light collector—refers to the combination of optics useful in certain embodiments of the invention comprising a input lens, aperture such as a slit, pinhole or multimode fiber, and a lens for collimating the light exiting the aperture.

Average human observer—refers to a human observer with no particular visual handicap.

Colorimetric matching constraint—when optimizing a match of the article or product spectrum to the light from a combination of multi-wavelength primaries, this constraint is applied to also drive a best match to the outputs from CMFs, either average observer CMFs or the measured consumer CMFs (a consumer CMF colorimetric matching constraint).

Color associated with the composite spectrum—the color that is produced by a display using mixing ratios for the primaries that have been calculated to generate a match to an article or product composite spectrum.

Color checker—is an array of scientifically prepared colored squares in a wide range of colors that span the visible spectrum and that represent the range of natural objects encountered in the world—when placed in a scene they can be used to color calibrate display of the photographed scene on any given display.

Color mixer—a device which combines radiation from sources having different center wavelengths so as to create a light field of spatially uniform color.

Composite spectrum—the spectrum resulting from the wavelength-by-wavelength multiplication of the article or product reflectance spectrum and an illumination spectrum—the illumination spectrum could be that used to illuminate the actual article or product or in some applications, it can be the consumer's lighting spectrum.

Consumer—a human user who is interested in identifying the color of a product for sale online or in printed pictures as they would perceive the physical item, also refers to a consumer of such color information wishing to establish the true color of the product.

Consumer's or remote user's illumination spectrum—the spectrum of ambient or directed light used to illuminate articles in the consumer's or remote user's environment.

Custom RGB display—a handheld display useful for displaying color using RGB primaries.

Display in high fidelity—a quality of remote color display that reproduces the article or product color such that normal observers the average human observer would consider that the reproduced color matches the original color of the article or product.

Display or display device—a device capable of displaying at least one pixel of color. The device can be an active light emitting device as in the case of a multi primary display using color emitters like LEDs or a passive screen that may be frosted for display of spectrally-filtered ambient light.

Ensemble of advertised products—a sample of products that would be advertised online or in video or print media sufficiently large to represent the gamut of colors that need to be reproduced for consumers.

Grating (grating optic)—an optical element that diffracts energy into its constituent wavelengths. It can be in the form of a ruled grating in which grooves are cut into a substrate or a holographic grating produced by interference lithography. Either type of grating can be made as either reflective or transmissive and can exhibit planarity or curvature.

Illumination type—one of the standard illumination spectra, such as D65.

Local—characterizing an item that can be viewed directly by the party interested in the item's color.

Multiprimary display—a color display using multiple primary wavelength emitters.

Pattern color map—a spatial mapping of the color code descriptors that compose a color pattern and can be used to display the color pattern.

Primaries—the set of three or more disparate wavelength optical sources used to compose a given color.

Published spectral information in a form for consumer use—either spectral data or corresponding primary mixing levels for remote user (ex. Consumer) use in display of article or product color in the form of a) electronic data that can be used in a color display device to display the reproduced color, b) printed form that can be manually entered into a display device, c) data published on a website that can be electronically downloaded for use in a display device or manually entered in a display device, or d) emailed data that likewise can be used for display of the article or product color.

Reflectance spectrum—comprises the values of the normal reflectance of the article or product as a function of wavelength, hence this spectrum characterizes the color of the article or product independent of illumination.

Remote—characterizing an item that is not local to the party interested in observing the item's color.

Remote reproduction—high fidelity reproduction of an article or product color at a location remote to the article or product.

Remote user—a human who either is a consumer as per the above definition of consumer or is a person making use of the presently disclosed method or device to reproduce the color of an article that is remote to them.

Remote user's ambient light—either the light in the environment of the user or light selected by the remote user to be directed to the color reproduction device for combination with the article or product reflectance spectrum in creation of the reproduced color.

RGB—red, blue, green.

Single pixel and single pixel data—refers to the single color of the article or product and the single colors of the color checker colors, not associated with an image. A single pixel of color can be expanded to multiple pixels in color calibration software for human visual interaction and still be considered "single pixel" to emphasize the non-imaging nature of the color reproduction or matching method.

Spatial light modulator—any device that is used to spatially modulate a light in one or more dimensions. The modulation can be accomplished with, for example, liquid crystal, magnetoptical, or digital micromirror devices.

Spectral information—information about an article or product color that comprises actual spectra, associated tristimulus values, amplitudes of a set of multi-primary LED intensities optimized to match the article spectrum, encoded spectral information, and ambient or illumination spectra.

Spectral match of the multi-primary display—calculating the mixing ratios for the LEDs of a multi-primary display to optimally match a color spectrum.

Standard color matching functions (CMFs)—any one of a number of standard CMFs for normal observers such as CIE 1931 or CIE 1964.

Total spectrum—this is the same as a composite spectrum.

True color—color rendering of the article or product that exhibits a spectrum that is sufficiently close to the actual article or product spectrum (reflectance spectrum or total spectrum) that the average human observer cannot discern a difference between the rendered spectrum (true color) and the article or product spectrum.

User—a person(s) who would be in receipt of an article or product color description code or information, wishing to view the associated color of the article or product.

Vendor—an entity selling a given product online or through printed description, also refers to a provider of color information about the given products.

Viewing screen—is a surface for displaying a color rendered by a device of the present invention for presentation to a user. A typical implementation comprises a frosted glass or polymer surface.

DETAILED DESCRIPTION OF THE INVENTION

Figure 1:
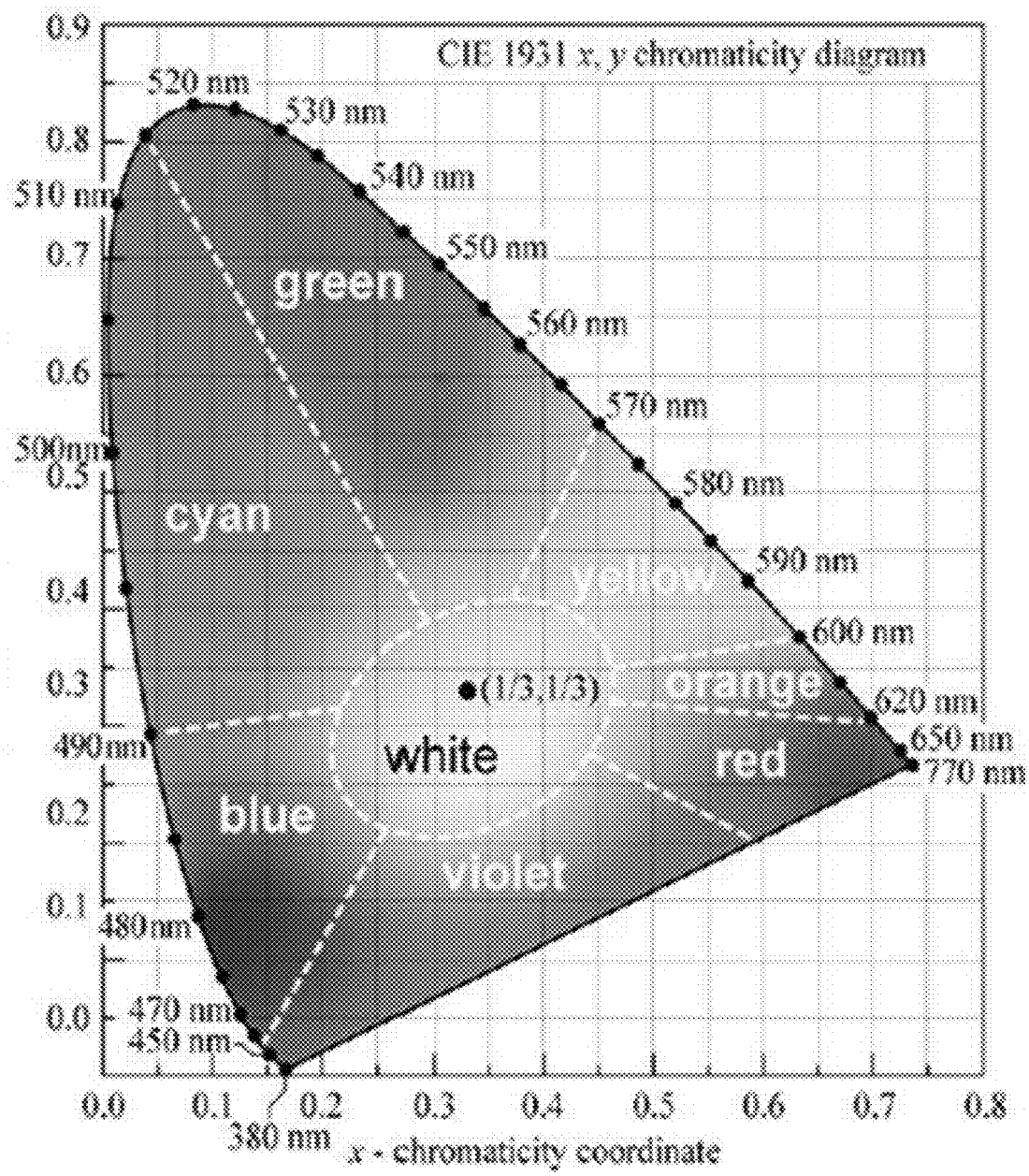
FIG. 1 is a plot of the CIE chromaticity diagram.
Figure 2:
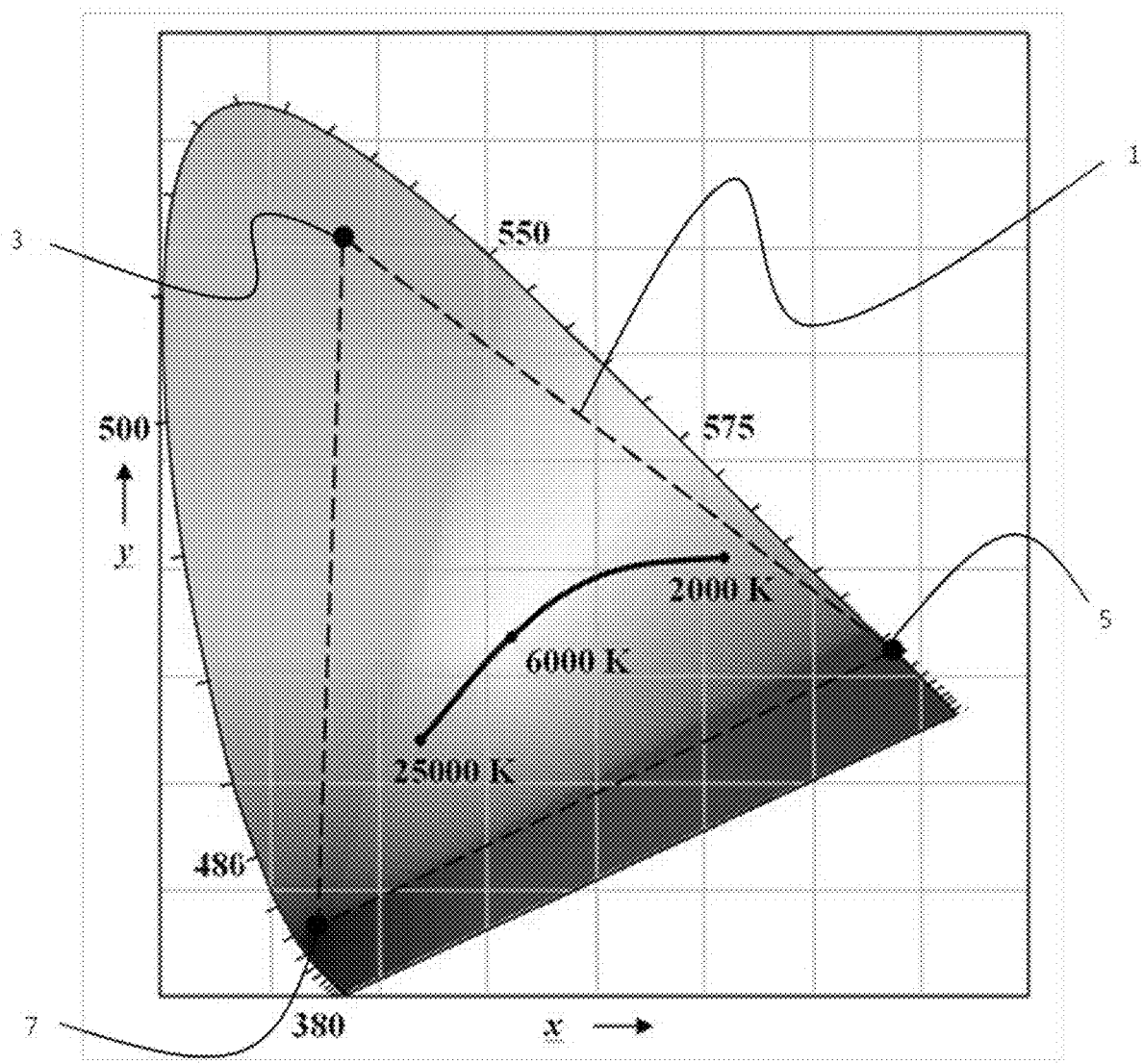
FIG. 2 is a plot of a three-primary gamut on the CIE chromaticity diagram.
Figure 3:
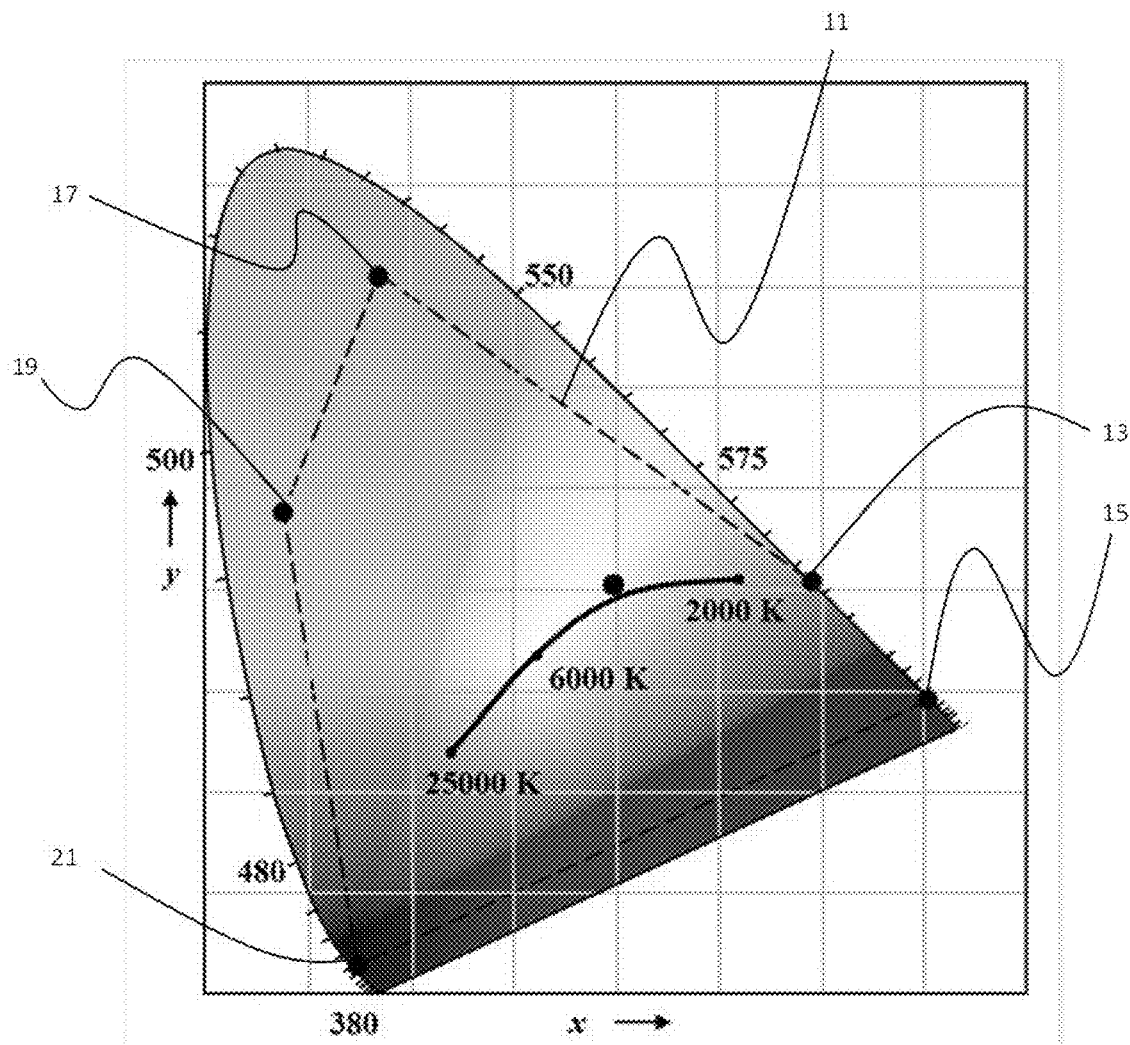
FIG. 3 is a plot of a five-primary gamut on the CIE chromaticity diagram.
Figure 4:
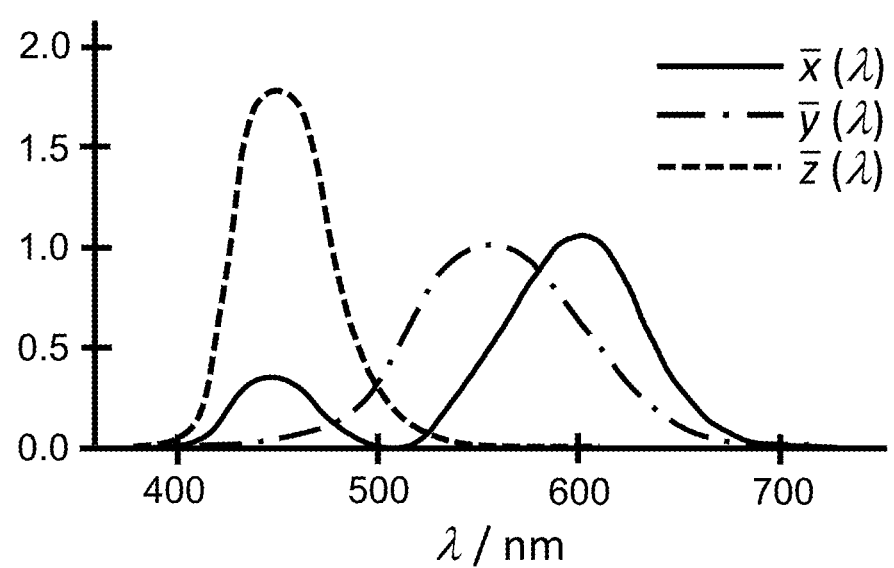
FIG. 4 is a plot of the three CIE CMFs.
Figure 5:
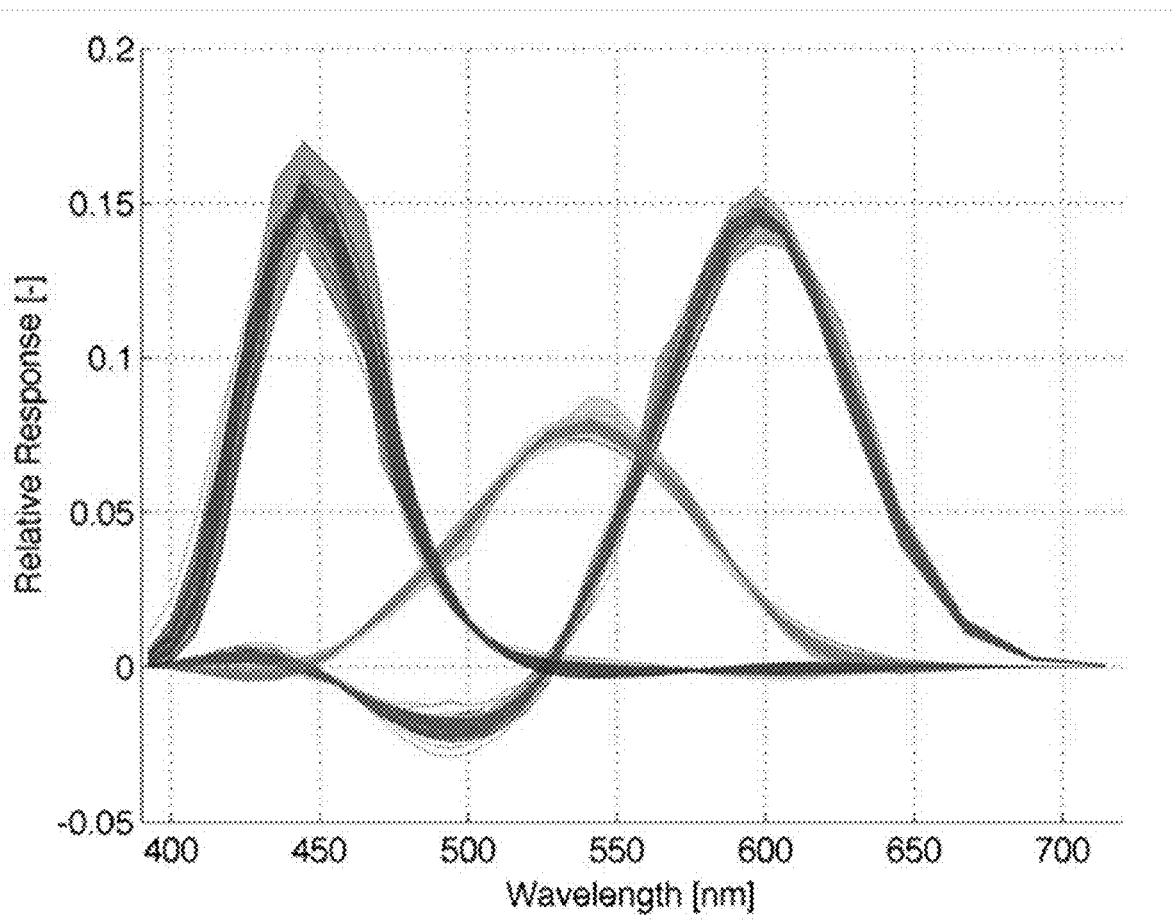
FIG. 5 is a plot of the spread in RGB CMFs among multiple standard observers.
Figure 6:
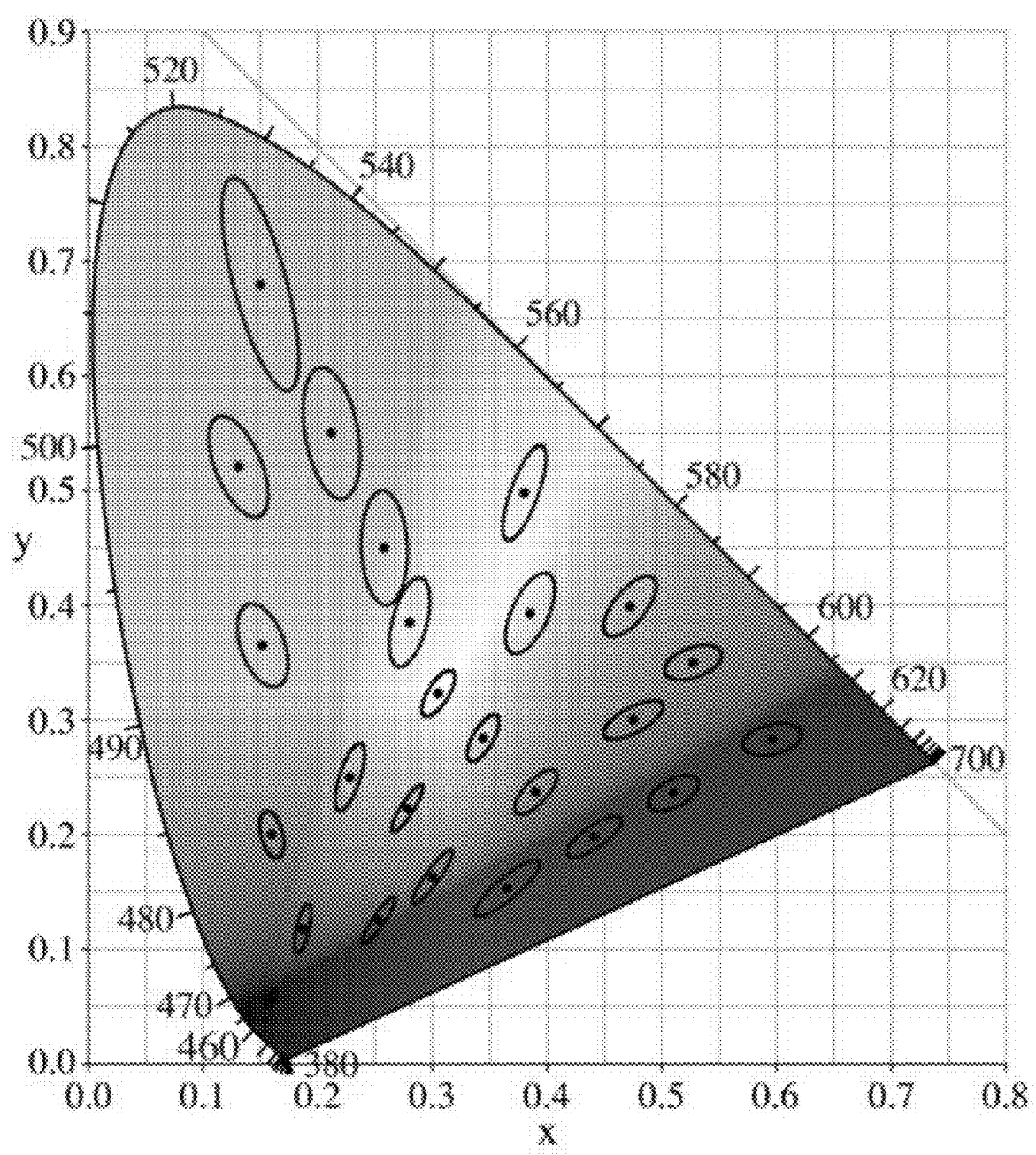
FIG. 6 is a plot of MacAdam ellipses on the CIE chromaticity diagram.
Figure 7:
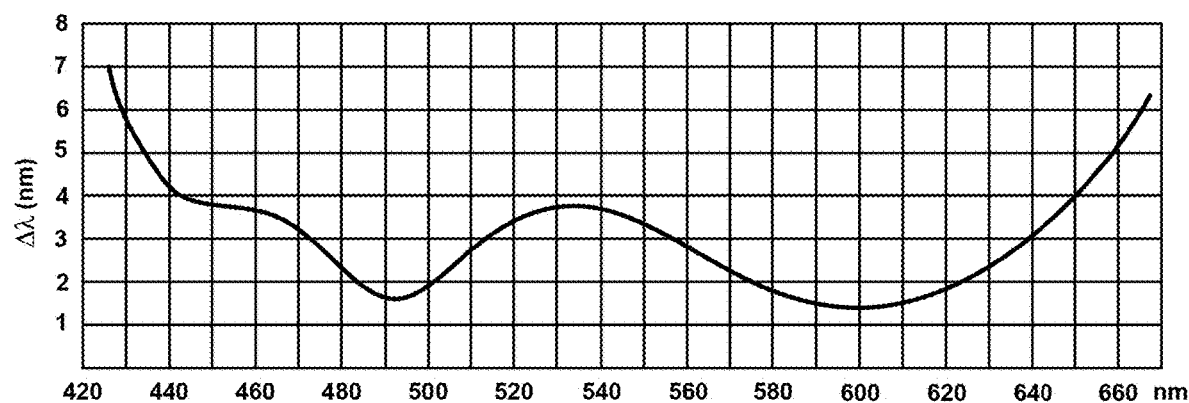
FIG. 7 is a plot of the just noticeable wavelength difference across the visible spectrum.

The method and system of the present disclosure requires the functions of article or product spectral measurement, for a multiprimary display, the calculation of mixing ratios for the primaries of the display to reproduce the color of the article or product, and implementation of spatial color mixing of the display primaries and for a spectral filtering display, the use of article or product reflectance spectra to filter ambient light.

Measuring the Spectrum of the Article or Product Color

There are nuances surrounding the capture of article or product color spectral information, some of these issues are avoided in the case of narrow field of view light capture, without background reflections. Nevertheless, the diffuse and specular components of article or product reflectance must be addressed. The spectrum capture should be along a normal to the local surface of the article or product and there should be not shadowing due to article or product geometry.

There are two modes of article or product spectrum measurement in the present color reproduction method. In the first mode, the total article or product spectrum is measured by the product vendor to include the result of both illumination and reflection. In the second mode, there are two instances of illumination spectrum measurement: a) the illumination spectrum is specially measured by the article or product vendor or an adopted standard is adequately implemented, and b) the illumination spectrum in the environment of the consumer is measured. This second mode is intended for use in mitigating illuminant metamerism.

The table below summarizes standard illumination spectra. The prevailing industry guidance is that CIE standard illuminant D65 should be used in all colorimetric calculations requiring representative daylight. It is advisable that at least two other instances of illuminants be used, perhaps one each for incandescent light and fluorescent light, respectively. Which illuminants to use should become an industry standard for the present method.

| CIE Standard Illuminants | Description |
|---|---|
| First three standard illuminants-introduced in 1931 | |
| A | Incandescent light with a correlated color temperature of 2856K |
| B | Representative of noon sunlight, with a correlated color temperature of 4874K |
| C | Average daylight (not including ultraviolet wavelength region) with a correlated color temperature of 6774K |
| D series (Natural Daylight) | |
| D50 | Representation of a phase of daylight at a correlated color temperature of 5000K |
| D55 | Representation of a phase of daylight at a correlated color temperature of approximately 5500K |
| D65 | Intended to represent average daylight and has a correlated color temperature of approximately 6500K |

| CIE Standard Illuminants | Description |
|---|---|
| | F series (Fluorescent Lighting) |
| F1-F6 | Spectra for "standard" fluorescent lamps consisting of two semi-broadband emissions of antimony and manganese activations in calcium halophosphate phosphor |
| F7-F9 | "Broadband" (full-spectrum light) fluorescent lamps with multiple phosphors, and higher CRIs |
| F10-F12 | Narrow triband illuminants consisting of three "narrowband" emissions (caused by ternary compositions of rare-earth phosphors) in the R,G,B regions of the visible spectrum |

First Mode of Article or Product Spectrum Measurement

Having measured the article or product color spectrum that includes illumination and article or product reflectance, the vendor can publish spectrum information corresponding to three different illuminants. Then, the consumer will be able to reproduce the article or product color as viewed under these three different lighting conditions.

Second Mode of Article or Product Spectrum Measurement

In this mode, the article or product color spectrum (that includes illumination and article or product reflectance) and the illumination spectrum are measured by the vendor. If a standard illuminant is adequately emulated by the vendor, then the identity of the standard spectrum can be published by the vendor for use by the consumer. Since the total spectrum comprises the product of the illuminant amplitude and reflectance amplitude at each wavelength, the reflectance spectrum can be derived.

The problem of separating illumination and reflectance spectra has been addressed in image and machine vision applications, which involve pixel-by-pixel separations. This has included the issue of spatially non-uniform illumination. (Xiaochuan Chen, Mark S. Drew, and Ze-Nian Li, "Illumination and Reflectance Spectra Separation of Hyperspectral Image Data under Multiple Illumination Conditions", Electronic Imaging 2017: Color Imaging XXII, Displaying, Processing, Hardcopy, and Applications, 29 Jan.-2 Feb. 2017, San Francisco.) Hence, a host of prior art algorithmic approaches to addressing this problem exist. Fortunately, the present application largely involves the degenerate case of uniform illumination and a scalar (single pixel) color signal. Prior art offers a number of ways to optimally estimate the reflectance at wavelengths where the total spectrum signal-to-noise-ratio is poor. For an article or product of uniform color, light from only a small region of the article or product surface needs to undergo spectral measurement. In the case of articles or products exhibiting variable color, uniform color regions of the article or product should be independently measured.

In order to reproduce the article or product color as would be observed in the consumer's environment with an multiprimary display, the ambient light or illumination spectrum present in the consumer's environment must be measured. Then it can be multiplied by the reflectance spectra published by the vendor to create the total spectrum that would be observed in this environment. Hence, there is need for a low cost spectrometer that would be used by the consumer in the presently disclosed method and system. Fortunately, do-it-yourself spectrometers with sub nanometer wavelength resolution (able to separate the Sodium-D lines) can be made very inexpensively. Examples use gratings comprising DVD material or grating films and a webcam detector. This technology can be incorporated into the color reproduction display device discussed below.

Third Mode of Article or Product Spectrum Measurement

In this mode, again, only the reflectance spectrum of the article or product is measured by the vendor, but the user's ambient light spectrum is not measured. The reflectance spectrum will be used with an adaptive spectral filter to spectrally shape the user's ambient light in accordance with the measured reflectance spectrum.

Lighting Conditions

As is well known in the prior art associated with article or product photography, guidance exists for optimal color photography of articles or products to include approaches to the use of fill or bounce light to soften shadows and choice of surrounding illumination environment. Emphasis in the presently disclosed method and system is to capture a small field of view that does not exhibit shadowing. However, some convex surfaces and textures may require such attention.

Generation of Amplitudes for a Multi-Primary Display

As discussed below, one approach to minimizing observer metamerism involves use of a multi-primary display with LED wavelengths determined by optimization calculations. To determine the relative intensities of these LEDs that best match the measured article or product spectrum, the method of Murakami et al (Yuri Murakami, Jun-ichiro Ishii, Takashi Obi, Masahiro Yamaguchi, Nagaaki Ohyama, "Color conversion method for multi-primary display for spectral color reproduction", J ELECTRON IMAGING, vol. 13, 30 Sep. 2004, pp. 701-708.) is employed.

The method gives the amplitude values of each primary of a multi-primary display device that minimize the spectral approximation error under the constraints of tristimulus match. The constraint used in the conversion is a tristimulus match for the standard observer, which is the same constraint for the conventional color reproduction. Under this constraint, this method does not need any information about the individual CMFs or deviations to minimize the difference between the spectra of the original object and the reproduced light.

If the color generation of an N-primary display is based on the additive mixture of the primaries, the spectral intensity of the reproduced light $P(\lambda)$ is approximately represented by $$P(\lambda) = \sum_{j=1}^{N} \alpha_j p_j(\lambda),$$

where $P_j(\lambda)$ (j=1, ..., N) is the spectral intensity of the full-emitted jth primary light and $\alpha_j (0 \leq \alpha_j \leq 1)$ is the amplitude of the jth primary. If $S(\lambda)$ is the spectral intensity reflected from the article for which color reproduction is desired, then the square error between $S(\lambda)$ and the reproduced spectrum by the N-primary display is defined as $$E = \int [S(\lambda) - P(\lambda)]^2 d\lambda.$$

The method determines the set of primary amplitudes $\{\alpha_1 \ldots, \alpha_N\}$ that minimizes E. When minimizing E, the constraints that the tristimulus values of the CIE standard observer are accurately reproduced are imposed. That is $$\int t_k(\lambda)S(\lambda)d\lambda = \int t_k(\lambda)P(\lambda)d\lambda, k=X,Y,Z,$$

Where $t_k(\lambda)$ are the CMFs of the CIE standard observer. These constraints are introduced because of the following reasons. If a set of primary amplitudes is optimized only for spectral approximation, the tristimulus errors for most observers can be considerably large, especially when the number of the primaries is insufficient. To reduce the average mismatch, tristimulus match for the CIE standard observer is effective because CIE standard CMFs are designed to represent the average color matching response of the population of human observers. The algorithmic solution to this optimization problem is found in the above reference to Murikami et al, which is incorporated herein by reference. Software to calculate the optimization solution is hosted on a computing platform for the vendor. These optimization results, in the form of relative LED amplitudes for either article or product total spectrum or reflection spectrum, can be published by the vendor for consumer use in the corresponding multi-primary display.

Color Mixing Optics

The presently disclosed method and system require means to create a uniform color display from a plurality of LEDs of different wavelengths. The uniformity of such color mixing must be sufficient that color variation is not detectable within the observer's field of view.

Great impetus for achieving good color homogeneity in multi-wavelength light mixing comes from the commercial lighting industry and luminaire product development. Initial approaches to color mixing from multiple LED sources simply relied upon use of textured surfaces, or diffusers for spreading of light. Often expensive optics with high numerical apertures are required to collect the spread light. Further, the efficiency and performance of such systems are inferior to newer approaches that involve light guiding. These latter designs typically have been optimized by simulation with Zemax or similar optical modeling software.

Many patents have been issued on the subject of color mixing and homogenization for LED sources. U.S. Pat. No. 9,746,596 is exemplary of methods that use molded optics and light pipe geometries. Also, commercially available optics have been developed for LED color mixing.

Examples include high efficiency molded polymer lenses for RGBW LED color mixing from Khatod, Milano, Italy (part number PL1590ME).

The most effective and compact implementations of color mixers that achieve spatially homogeneous color and intensity use a combination of light pipes, refractive and reflective interface geometries, and diffusion. An example (Sun, C. C.; Moreno, I.; Lo, Y. C.; Chiu, B. C.; Chien, W. T. Collimating lamp with well color mixing of red/green/blue LEDs. Opt. Express 2012, 20, A75-A84) is a compact optical system for RGB color mixing that demonstrates use of only compact monotonic surfaces in the optical design. It comprises a relatively short (less than 10 millimeters length), straight lightpipe with silver scatter sheet reflective walls, a volume scattering diffuser, and a total internal reflection (TIR) output lens. A luminaire design for a larger number of multi-wavelength LEDs (Maumita Chakrabarti, Henrik Chresten Pedersen, Paul Michael Petersen, Christian Poulsen, Peter Behrensdorff Poulsen, Carsten Dam-Hansen, "High-flux focusable color-tunable and efficient white-light-emitting diode light engine for stage lighting", Optical Engineering 55 (8), August, 2016.) demonstrates a departure from color uniformity over a few degrees viewing angle of less than 0.001 percent. It exploits a microlens array, a parabolic reflecting surface, and a TIR lens.

Another approach which entails using freeform optics to map out light ray trajectories is exemplified by the design of Chen et al. (Enguo Chen, Rengmao Wu, Tailiang Guo, "Design a freeform microlens array module for any arbitrary-shape collimated beam shaping and color mixing", Optics Communications, Volume 321, 15 Jun. 2014, Pages 78-85.) This freeform microlens array module, which shows better flexibility and practicality than the regular designs, can be used not only to reshape any arbitrary-shape collimated beam (or a collimated beam integrated with several sub-collimated beams), but also most importantly to achieve color mixing.

A novel mixing approach is detailed in U.S. Pat. No. 9,022,598 which discloses combining the zero spatial frequency components of colored sources to achieve homogenization of composite color. The invention exploits the fact that extended and non-overlapping light emitting sources arranged in a specific pattern may overlap in Fourier space.

Finally, multi-wavelength beam combining can be achieved with consecutive introduction of each color beam into the composite beam using multiple dichroic filters like the LaserMUX™ filters manufactured by Semrock. However, this approach is relatively expensive.

Light guiding techniques are most adaptable to the display concept of the present disclosure and support the fabrication of a compact, handheld display device as described in more detail below. In fact, the same method of LED color mixing can be used for both rendering of colors necessary for measurement of consumer CMFs and in the final multi-primary display of reproduced article or product color.

A Preferred Implementation of Color Mixing

An adaptation of the aforementioned concepts that permits color mixing of as many as 8 different wavelength LEDs in a compact geometry can employ light guiding, with volumetric and surface scattering, and appropriately designed refraction and reflection to obtain color display that exhibits imperceptible nonuniformity.

Measuring Individual CMFs

Fedutina et al. (M. Fedutina, A. Sarkar, P. Urban, P. Morvan, "(How) Do observer categories based on CMFs affect the perception of small color differences?", Color and Imaging Conference 2011(1), pp. 2-7.) demonstrated in nine categories of observers based on color perception metrics, significant departure of the individual response from the CIE standard observer. The determination an individual's CMFs can be paramount in achieving color matches below the threshold of difference detection.

Methods of Measuring CMFs

Various methods of measuring the consumer's CMFs delineated herein are within the scope of the present invention. The most commonly used approach is the maximum saturation method, which was used by Wright (Wright, W. D., "A re-determination of the trichromatic coefficients of the spectral colours", Transactions of the Optical Society. 30:141-164, 1929.) and Guild (Guild, J. 1932. The colorimetric properties of the spectrum. Philosophical Transactions of the Royal Society of London, Series A. 230:149-187.) to obtain color matches that were subsequently used to generate the CIE 1931 CMFs. In this method, the observer is presented with a half field illuminated by a "test" light of variable wavelength, λ, and a second half field illuminated by a mixture of red (R), green (G) and blue (B) primary lights. At each λ, the observer adjusts the intensities of the three primary lights, so that the test field is perfectly matched by the mixture of primary lights.

In Maxwell's method (referenced below), preferred for the present application, the matched fields always appear white, so that at the match point, the eye is always in the same state of adaptation whatever the test wavelength (in contrast to the maximum saturation method in which the chromaticity of the match varies with wavelength). In a matching experiment, the subject is first presented with a white standard half field, and is asked to match it with the three primary lights. The test light then replaces the primary light to which it is most similar and the match is repeated.

Fitting Data to Parametric Models

In the work of Asano et al. (Yuta Asano, Mark D. Fairchild, and Laurent Blondé, "Individual Colorimetric Observer Model", PLoS One. Feb. 10, 2016; 11(2): e0145671, eCollection), eight additional physiological parameters are added to the two parameters in the CIE 2006 Physiological Observer construct to model individual color-normal observers. These eight parameters control lens pigment density, macular pigment density, optical densities of L-, M-, and S-cone photopigments, and $\lambda_{max}$ shifts of L-, M-, and S-cone photopigments. By identifying the variability of each physiological parameter, the model can simulate CMFs among color-normal populations using Monte Carlo simulation which is computationally intensive.

Hardware Approaches to Measurement of CMFs

A concept demonstrated in 1989 was a visual four-channel colorimeter that uses the Maxwell method (Mark Fairchild, "A novel method for the determination of CMFs", Color Research & Application 14(3), June 1989, pp. 122-130.). It used laser lines for the three red, green, and blue primaries and a broadband spectral source comprising a tungsten-halogen lamp. The three primaries plus the spectral source illuminated one half of a bipartite field. The other half was illuminated with a daylight simulator. The three primaries were intensity modulated by acousto-optic modulators under observer control. Observers made matches using the Maxwell method for five wavelengths and simulated daylight. From the visual results, color matching function for the entire visible spectrum were estimated using a statistical model. The model assumed that CMFs are a linear transform of cone sensitivities convolved with differences in the macular pigment and amount of scattering in the crystalline lens. The five wavelengths were selected to provide estimates of the level of macular pigmentation, the level of lens scattering, and the elements in the linear transform. Nonlinear optimization was used to estimate the model parameters. This approach can be revisited with an LED implementation for the presently disclosed method and system.

With time, advances in color matching filter measurement have provided simpler, more compact, and cost-effective devices. Two foremost examples comprise devices that also use Maxwell's method. In the first example (Yasuki Yamauchi, Yasuhisa Nakano, Masatomo Kamata, Katsunori Okajima, Keiji Uchikawa, Yuri Murakami, Masahiro Yamaguchi, and Nagaaki Ohyama, "Measurement of CMFs using a digital micro-mirror device", OSA Fall Vision Meeting, December 2003.) the system can present a test stimulus whose spectral power distribution can be arbitrarily set by adjusting the power of every monochromatic light between 400 to 700 nm with a step of 10 nm. This is realized by selectively switching a digital micro-mirror, on which the spectrally decomposed light from a diffraction grating is focused. Thirty two independent compound lights are used as a test stimulus. The observer adjusts the color of the test stimulus to match that of the reference white. A two-degree bipartite field is used to present the test and the reference stimuli.

A conventional bipartite apparatus to measure CMFs usually consists of plural optical paths; a path for a test stimulus consisted of three primaries, and that for the reference stimulus. The primaries should be presented to both optical paths, as "negative" light in the reference stimulus is sometimes required to complete color matching. Thus, the conventional apparatus should have plural light sources in each optical path and requires complicated alignments. In the second device example (Yasuki Yamauchi; Minoru Suzuki, Taka-aki Suzuk, Katsunori Okajima, "Measurement of CMFs with a compact and simple apparatus using LEDs", OSA Fall Vision Meeting, December 2010.), so as to realize a compact apparatus to measure CMFs, the researchers developed a bipartite apparatus with time-controlled LED lights.

Specifically, they used a single light source, which consisted of plural LEDs inserted to a small integrating sphere (4" diameter). A beam splitter was used to divide the light into two optical paths. The optical path, which was delivered to a subject, was temporally switched in alternating fashion. Its frequency was high enough for the observer not to detect the flicker of the lights. By changing the switch timing of the LEDs, it was possible to arbitrarily select any combinations of the LEDs to present in either the test or the reference stimulus area. Subjects adjusted the intensity of the test stimulus which was controlled by pulse width modulation. The resulting device was a compact CMF-measuring apparatus that can present bipartite stimulus with a single light source by time-controlled switching and modulation of the LEDs.

An embodiment of the presently disclosed method and system involves incorporating CMF-measuring functionality. In one approach, the individual's CMFs are measured with the same device that is used to display a reproduced article or product or article color. The same type of LED light collection and mixing optics are used for both CMF measurement and reproduced article or product color display. Also, it is important to emphasize that a consumer need measure his CMFs only once.

Implicit Measurement of CMFs

An embodiment of the presently disclosed method and system that implicitly incorporates consumer CMF information comprises vendor use of color calibrating color checkers and consumer use of a software application that exploits the color checker information for display color calibration to compensate for illumination and camera spectral effects. The display however needs to have calibration to spectral standards such as by use of a colorimeter before shifting its color response using a color checker. The aforementioned do-it-yourself spectrometer can be modified to be a tristimulus colorimeter that uses the CIE CMFs to filter raw spectra. For this, the CMFs are used in software to digitally filter the spectral data.

A popular color checker product from X-rite has the following description from their website (X-ritephoto.com):

"The ColorChecker® 24 Patch Classic target is an array of 24 scientifically prepared natural, chromatic, primary and gray scale colored squares in a wide range of colors. Many of the squares represent natural objects, such as human skin, foliage and blue sky. Since they exemplify the color of their counterparts and reflect light the same way in all parts of the visible spectrum, the squares will match the colors of representative sample natural objects under any illumination, and with any color reproduction process."

The X-rite ColorChecker Passport product suite includes three different color patch arrays that are placed in the scene to be photographed. An associated software application uses scene images containing these color patch arrays to calibrate the photo display. This technology can be employed in the presently disclosed method and system in the following ways. In the first way, one or more images of the article or product are captured with the color checker patch arrays included in the image (An industry agreed-upon standard for illumination would be desirable.) Such images, preferably in an electronic form (likely involving conversion between DNG format and others) would be used by the consumer to color calibrate the consumer's display (smartphone, tablet, monitor, etc.) for correct article or product color reproduction by use of an automated software application.

A custom color checker array of colors can be composed based on an anticipated gamut of colors spanned by a large ensemble of articles or products because many colors within this gamut may be more saturated than those of the natural environment. It may be necessary for creation of an industry standard as a result. In the example of wound imaging, it was demonstrated that choosing a custom array of colors that best represented the wound images in a database improved color rendition upon reproduction compared to the standard Macbeth color checker (Hazem Wannous, Sylvie Treuillet, Yves Lucas, Alamin Mansouri, Yvon Voisin, "Design of a Customized Pattern for Improving Color Constancy Across Camera and Illumination Changes", Conference: VISAPP 2010—Proceedings of the Fifth International Conference on Computer Vision Theory and Applications, Angers, France, May 17-21, 2010—Volume 1) Another way to employ this technology is to focus on "single pixel' information, since a main application of the presently disclosed method and system is single color capture and reproduction. In this case, it is necessary only to include single pixels of the colors of the color checker captured under the same lighting as the article or product (the article or product color also may be represented by a single pixel). These single pixel values would be published for use by the software application for the consumer's display color calibration.

One final prospect for effectively measuring a consumer's CMFs involves using a smartphone with the display in camera viewfinder mode. An app would permit the user to adjust the viewfinder display hue(s) to match the hue(s) of the actual object, color checker, or scene being viewed through the camera. Given the spectral responsivity of the camera, the user CMFs can be determined. Other software functionality would import the vendor-provided article or product spectrum information and filter it with the user CMFs to display the resulting reproduced article or product color on the smartphone display.

A Preferred Implementation of CMF Measurement

The approach to measurement of the consumer's CMFs favored in the presently disclosed method and system uses a time division multiplexed display of each bipartite field using the same LEDs, as discussed by Yamauchi et al. In this approach, a beam splitter splits the color mixed light into two optical paths; a test stimulus path and a reference stimulus path. Each optical path is alternately blocked off by an optical chopper. Depending on the timing of the optical chopper, only one of the test or the reference stimulus is presented to the observer. Moreover, the switching timing of the LEDs is controlled to synchronize with that of the optical paths. Therefore, it is possible to arbitrarily choose any combinations of the LEDs to be presented both to the test and to the reference stimulus area. A switching frequency of 100 Hz permitted the perception of a continuous stimulus.

For the presently disclosed concept, the optical chopper (switching function) can be accomplished by a low cost projector LCD operated as a spatial light modulator (SLM) that shutters each bipartite field independently. The consumer would adjust the individual LED intensities through pulse width modulation (PWM) control (color weighting of LEDs is achieved in the multi-primary display by PWM also). Processing means included in the CMF measuring device support Maxwell's method of measurement.

The CMF measurement device can be standalone or preferably made part of the product color reproduction display. In the latter case, the CMF measurement LEDs can be a subset of those used in the multi-primary display or additional LEDs exhibiting other wavelengths. In a monocular display, the visual field is partitioned when the display device is in CMF measurement mode. For multi-primary display of reproduced product color, the full monocular field would not be partitioned.

Implementation of Article or Product Color Reproduction Display with Multiple Primaries In a first example embodiment of the presently disclosed method and system, optimum choice of LEDs is paramount for achieving color reproduction with adequate fidelity. LED performance parameters such as nominal intensity operating regime and current levels, relative wavelength insensitivity to ambient and junction temperature, and optical bandwidth must be optimized for the present application. When used as primaries for color reproduction, narrowband LEDs permit increased color display gamuts but can worsen metamerism, whereas broadband LEDs, by filling in spectrum, can diminish metamerism at the expense of more limited gamuts.

In the paper by Ramanath, (R. Ramanath, "Minimizing observer metamerism in display systems," Color Research and Application, Vol. 34, pp. 391-398, 2009), observer metameric failure for different types of displays having three primaries is examined. In particular, Ramanath explores the comparative occurrence of observer metameric failure among different electronic display devices, including cathode ray tube (CRT) displays, liquid crystal display (LCD), digital light processor (DLP) and LED based displays, a cold cathode fluorescent lamp (CCFL) based display, and a laser display. Ramanath concludes that observer metameric failure can occur more frequently, and provide greater perceived color differences, as the display spectrum narrows (smaller FWHM) or the number of modes in the display spectrum increases. As a result, the laser display and CCFL display, which lack spectral color diversity due to narrow or multi-modal spectra, have a high propensity to cause observer metameric failure. By comparison, the CRT and lamp based DLP displays, which have broad primaries ($\Delta\lambda$ of approximately 60-70 nm FWHM), exhibit low potential for observer metameric failure. In the case of laser displays, where the spectral bandwidths can easily be 2 nm or less in width, a small expansion of the lasing bandwidths, at the cost of a small color gamut decrease, would provide a reasonable trade-off if observer metameric failure is significantly decreased. However, Ramanath found that spectral distributions with moderate FWHM bandwidths ($\Delta\lambda$ of about 28 nm), such as LED illuminated displays, can still produce significant perceptible observer metameric failure, suggesting that reductions in observer metameric failure may not come quickly with increases in spectral bandwidth.

It is critical to reduce observer metamerism in any method that seeks high fidelity color reproduction. As discussed previously, the present method invokes one of two alternative approaches to mitigation of observer metamerism. In one approach, the CMFs of the consumer are measured so that an article or product spectrum rendered against these consumer CMFs in an RGB display creates color reproduction fidelity. In the alternative approach, the article or product spectrum is mathematically optimized for a multi-primary display using LED wavelengths determined to reduce observer metamerism.

Further, there are two options for the former approach. In one, the vendor-published article or product spectrum is filtered by the measured consumer CMFs to provide drive signals to the red, green, and blue channels of a custom LED display, using three (or multiples thereof) LEDs. In the other, extant displays such as those of a smartphone, tablet, or monitor are calibrated against the measured consumer CMFs. A low cost spectrometer (of the DIY variety put into large scale production or the low cost kit for a smartphone spectrometer) can be employed for this purpose.

There are two options for the spectrum mathematical optimization approach, namely, varying relative intensities of individual primaries of a multi-primary display under a constraint that a) uses the CMFs of CIE standard observers or b) uses the measured CMFs of the user. The location of the computing platform that performs such optimizations would be dictated by which source of CMFs (CIE standard observers or the user) was used and the type of color reproduction application, whether it is remote consumer color matching or another application.

Custom Color Display

A custom three color LED-based display will render colors in accordance with the measured consumer's CMFs. Hence the wavelengths and optical bandwidths of the RGB primaries are not critical with respect to observer metamerism, but can be optimized for improved gamut. The display would be incorporated into a handheld unit after the fashion of FIG. 9.

Figure 8:
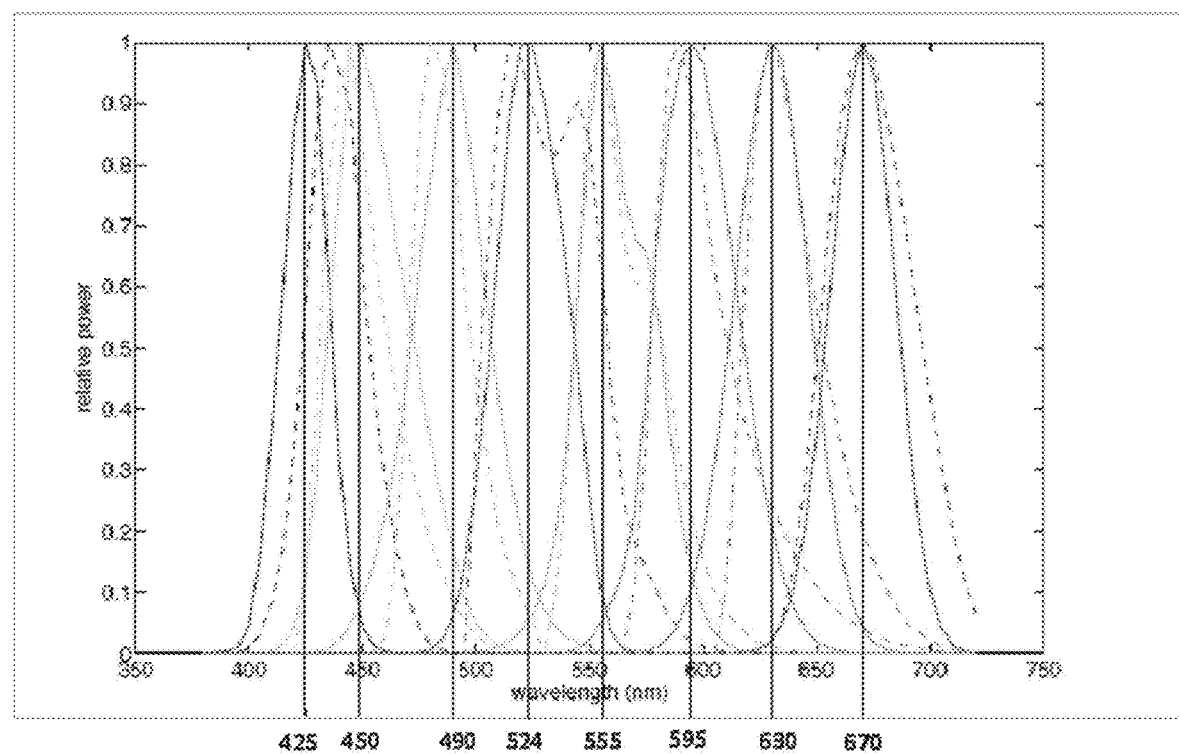
FIG. 8 is the spectral plot of primaries at eight specific wavelengths that can be used to minimize observer metamerism.

The aforementioned latter approach to reducing observer metamerism is based on some multi-primary display research (David Long, Mark D. Fairchild, "Reducing observer metamerism in wide-gamut multi-primary displays", SPIE Proceedings Volume 9394, Human Vision and Electronic Imaging XX; 93940T (2015). It had been postulated that multi-primary design paradigms may hold value for simultaneously enhancing color gamut and reducing observer metamerism, considering expansion of the area spanned on the chromaticity diagram and increased spectrum sampling. This research determined that by carefully selecting primary spectra in systems employing more than three emission channels, intentional metameric performance can be controlled. Different wavelength sources were used to minimize observer metamerism against the CIE standard observer CMFs over an ensemble of reference spectra. The resulting 8 Gaussian model primaries are provided in FIG. 8. The identified wavelengths are 425, 450, 490, 524, 555, 595, 630, and 670 nm. Hence, the multi-primary display of the presently disclosed method and system employ LEDs with wavelengths such as these derived from minimum observer metamerism optimizations. It is possible to further decrease the error in spectrum matching by using more than 8 primaries.

Figure 9:
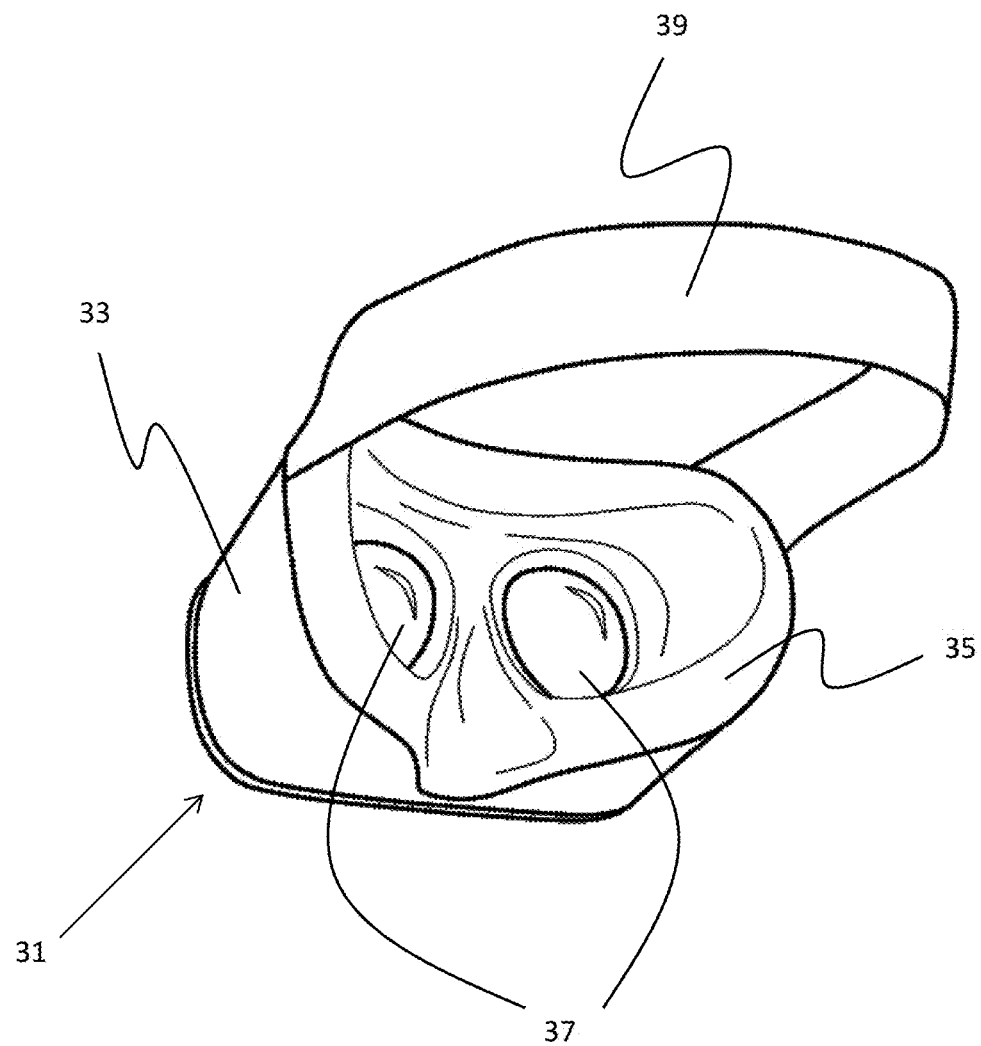
FIG. 9 is a pictorial view of a color reproduction display device for consumer use.

An example display device for the presently disclosed method and system is in the form of a headset 31 (similar to a virtual reality headset) which blocks ambient and background light as depicted in FIG. 9. The housing 33 is compact but sufficient to house optics and electronics. The molded interior 35 is designed to fit the facial contour and thereby prevent ambient light entry into the visual field when the head strap 39 is affixed to the head in snug fashion. Both left and right apertures 37 admit reproduced color light or can be used to display sequences of colors for the purpose of CMF measurement. The LEDs, color mixing optics, associated electronics and batteries are incorporated within.

Whether using a custom RGB three color LED display or an 8-primary LED display for variants of the presently disclosed method and system, attention must be paid to wavelength stability of the LEDs. As stated before, shifts in wavelengths approaching one to two nanometers are problematic given this is the threshold of change detectable by humans. Consideration must be given to how the wavelengths of LEDs selected for use in the custom RGB or multi-primary display can be made stationary over variation in drive level and ambient temperature.

Color mixing ratios require variable intensity of the individual LEDs. The intensity of the LEDs is altered either by continuous current (analog) dimming or by pulse width modulation (PWM) of constant current sources (ex. the integrated current source LT3083). Attempts to decouple LED drive level (current) from wavelength shifts have emphasized the latter approach. However, PWM does affect LED wavelength (Steven Keeping, "LED Color Shift Under PWM Dimming", https://www.digikey.com/en/articles/techzone/2014/feb/led-color-shift-under-pwm-dimming). It turns out that the change in peak wavelength (and hence chromaticity) is due to the fact that lower duty cycles heat the LED p-n junction less than higher cycles. The physics is complex, but in essence, junction temperature alters the chromaticity because the LED's band gap (which determines the wavelength of emitted photons) narrows as the temperature rises. It is important to point out that LED wavelength shift due to aging is not a factor for the currently disclosed method and system because it takes thousands of hours before human observation would detect a change.

Given this state of affairs, remedies sought for tendencies to incur wavelength shift appear in the form of two approaches. In the first, the LED current nominally is set to correspond to the nominal target wavelength and nominal intensity and PWM is used to precisely establish LED intensity to satisfy color mixing ratios. In this case, wavelengths of the LEDs are sensed to provide feedback control of current drive, thereby maintaining constant wavelength.

Figure 10:
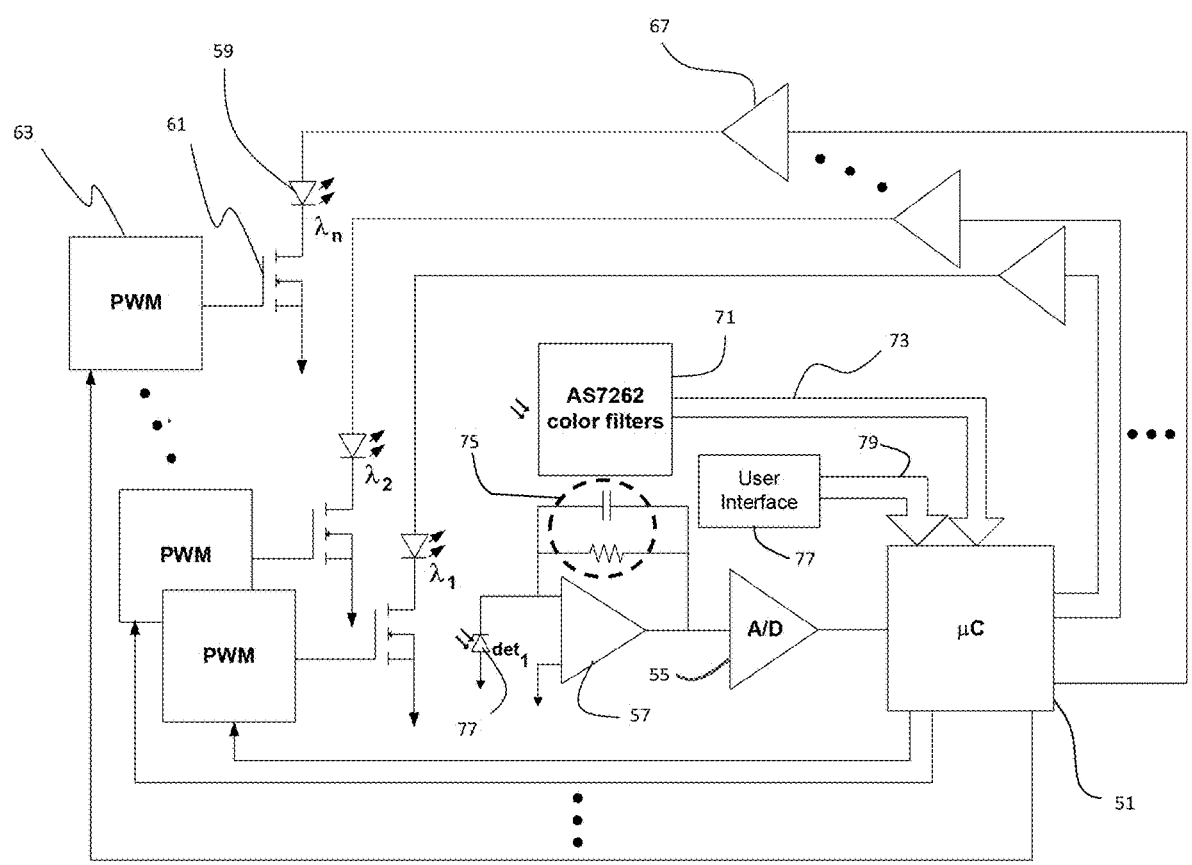
FIG. 10 is schematic and functional diagram of the control circuitry for a multi-primary display used for color reproduction.

FIG. 10 details a candidate wavelength and intensity control circuit. Intensity and wavelength detection controls LED current, whereas intensity detection controls PWM duty cycle for the purpose of color mixing. The PWM duty cycle is set corresponding to the appropriate color mixing value and then the current is adjusted to tune the wavelength. There may be some iteration in adjustment of PWM and current to maintain LED target intensity and target center wavelength. A processor or microcontroller 51 receives inputs 79 from the user interface 78 that controls the mode of operation, i.e. as a color reproduction display or a CMF instrument. In the color reproduction mode, the user interface supplies the target color amplitude weights for color mixing. The processor 51 determines the appropriate duty cycle for the various pulse width modulators 63 to establish relative LED 59 intensities. The intensities of the LEDs 59 are measured by detector 77 in concert with the transimpedance amplifier 57 using feedback network 75. The analog output of this amplifier is converted by A to D converter 55 for input to processor 51. The modulators 63 control the current switches 61. The closed-loop current drive level for each LED 59 is established by processor 51 which communicates the corresponding voltage levels to programmable voltage sources 67 based upon the responses 73 of the color filter chip (AS7262) 71. The integration time for the filter outputs of the AS7262 is 5.6 milliseconds, so continuous color control cannot be performed because the update rate would be below 400 Hz human perception flicker frequency. This implies intermittent closed-loop calibration of color, but this should not be problematic given the slow rate of color drift. In the CMF measurement mode, the processor 51 controls the display of bipartite color matching sequences and records user responses through the user interface in order to determine the user CMFs.

Different LED technologies, device geometries, and operating regimes exhibit different wavelength shift behavior with drive current and ambient temperature. For example, some surface mount LEDs undergoing large current changes only change dominant wavelength by 2 nm, whereas ambient temperature can shift wavelength +0.03 to 0.13 nm/degrees C. depending on die type. For the commercial temperature range of 0 to 70 degrees C., this would result in a center wavelength shift of between 2.1 and 9.1 nanometers. Also, the center wavelength and full-width-half-max (FWHM) of the spectrum vary with forward current. So closed loop wavelength control by current variation for this category of LEDs would be counterproductive. However, an LED with a small wavelength sensitivity to junction temperature, $d\lambda/dT$, tends to have a small wavelength sensitivity to forward current, $d\lambda/dI_F$.

The work of Raypah et al. evaluated several manufacturers of low power surface mount device (SMD) LEDs to determine that junction temperature approximately tracks ambient temperature at full forward current (Muna E. Raypah, Mutharasu Devarajan, and Fauziah Sulaiman, "Modeling Spectra of Low-Power SMD LEDs as a Function of Ambient Temperature", IEEE Transactions on Electron Devices, February 2017, pp (99): 1-7.). For categories of low power SMD devices, this implies that a commercial temperature range swing results in the same junction temperature swing which makes low $d\lambda/dT$ devices an acceptable paradigm. Hence, the best approach is to search out LEDs with small wavelength sensitivities to junction temperature and current and use bin selection to get under 1 nm error in initial peak wavelength. Then the system can be operated open loop with respect to LED wavelength control. PWM would be used in establishing color mixing ratios.

Examples of wavelength stable LEDs are given in the table below.

| LED Part | Temperature Sensitivity (nm/deg C.) |
| --- | --- |
| InGaN Mars Green LED Chip part no. ES-CEGHM10A | 0.030 |
| Seoul Semiconductor 801 Red Series part no. SRT801-S/STR0A12AR | 0.026 |
| LUXEON Rebel and LUXEON Rebel ES Colors | 0.01 to 0.05 |
| InGaN Cree ® TR5050 ™ | 0.048 |

Another consideration is to use multiple LEDs of the same wavelength for each of the primaries. This reduces drive current to any given LED by this same multiple, thereby reducing junction temperature which can be useful for wavelength stability.

External Light Modulation

Figure 11:
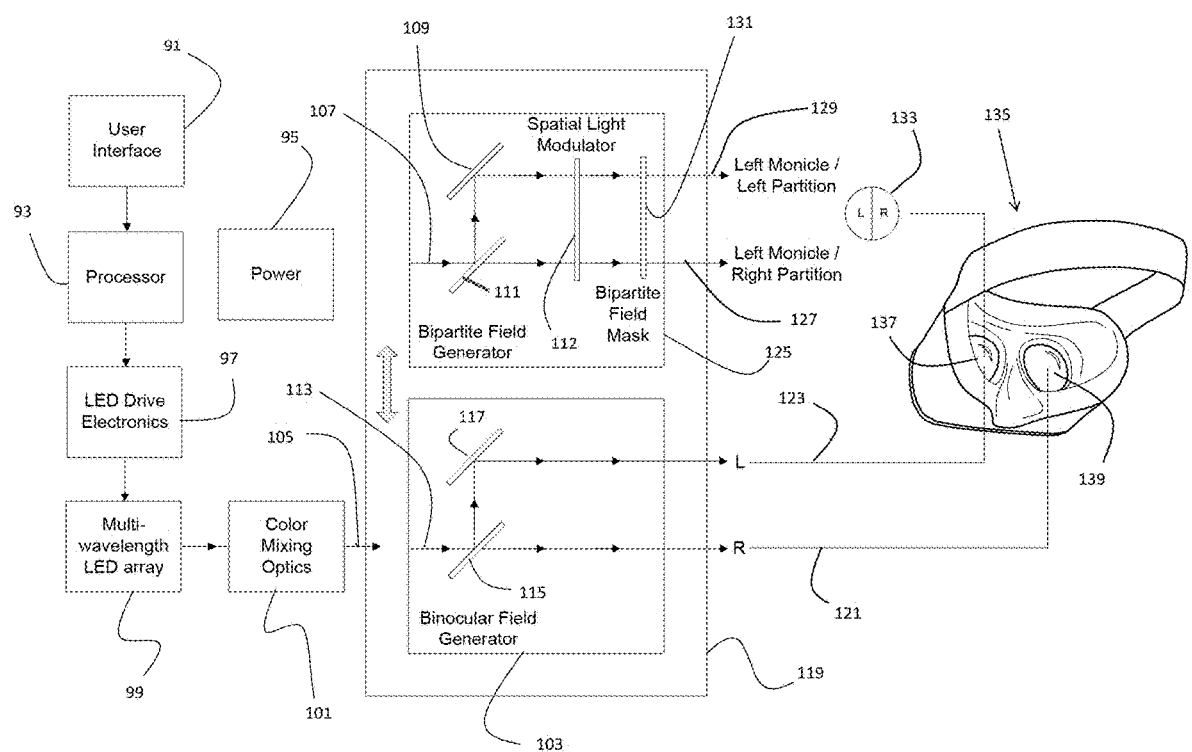
FIG. 11 is a schematic and functional diagram of a color reproduction display system including color matching function measurement capability.

An alternative to driving current-based PWM of LEDs is external modulation of constant intensity light sources by spatial light modulator technology such as Texas Instruments' Digital Micromirror Device (DMD) technology trademarked under Digital Light Processor™. Variation in the duty cycle of micromirror deflection of the light achieves up to 10 bits of grayscale modulation dynamic range. These devices are mass produced in high definition size arrays for video entertainment products. In such a device, subarrays of mirrors can be synchronously driven to create multiple, independent modulators in one device. Smaller array sizes of these devices can be cost effective in large quantities. In an example of the lower definition 640×360 micromirror array used in pico projectors, subarrays of 90×90 mirrors can be driven synchronously to create 8 or 9 independent modulators exhibiting much larger area than that of a single mirror. This relaxes constraints on the light collection and focusing optics of the present invention. The combination of LEDs with temperature stable center wavelengths at fixed drive currents and external, low loss modulation mechanisms such as DMDs offers a robust approach to accurate spectral composition when using a selection of optimal primary wavelengths and optimized intensity weights for spectral matching The comprehensive functionality of a custom display device is shown in FIG. 11. Included in the user interface 91 is provision for data communication such as Bluetooth or USB input. Even keypad entry of coded data can be an option. Such coded data may be manually transcribed from an email, product catalog entry, or product flyer. If color data is provided by the vendor as a QR code (encoding over 7,000 digits of data), it can be read by a smartphone with appropriate app for export to the custom display device through Bluetooth, and decoded as an example. Any number of methods of data formatting and input as well known in the prior art can be envisioned for introduction of spectrum information through the user interface. A power supply 95 in the form of a battery or external power connection is included. As previously described, the processor 93 governs how each device mode (color reproduction or CMF measurement) operates. In the color reproduction mode, the processor 93 provides LED control electronics 97 with the target LED drive levels and amplitude mixing ratios for energizing the LEDs of the multi-wavelength LED array 99 in accordance with the selected mode of operation. The outputs of the multi-wavelength LEDs are spatially homogenized in the color mixing optics 101. This type of display device can be used to achieve an RGB or a multi-primary implementation. A mechanical selection of function is depicted with the use of a sliding platform 119. Either the input optical axis 113 of the binocular field generator 103 (for color reproduction display) or the input optical axis 107 of the bipartite field generator 125 (for CMF measurement) can be selected to receive the output 105 of the color mixing optics 101. Such mechanical selection is sensed by processor 93 through switch sensor means not shown.

The binocular field generator 103 which creates two equal intensity optical fields is depicted as a simple combination of beamsplitter 115 and folding mirror 117. The left beam 123 and right beam 121 are directed to the headset display apertures 137 and 139, respectively. The bipartite field generator 125 depicts a beamsplitter 111 and folding mirror 109 that create right and left equal intensity bipartite beam paths. The spatial light modulator 112 provides different multiplexing of right and left bipartite beam paths that is synchronized with LED drive signals to create the disparate right and left visual fields as observed by the user. Element 131 represents a mask for limiting light leakage between right and left bipartite fields.

There is the additional prospect of including in this custom display device, low cost spectrometer functionality that can be used to capture the consumers lighting environment spectrum. As previously discussed, such spectral information can be combined with the article or product spectrum to produce a total spectrum which, upon display, would represent how the article or product would be perceived in the consumer's environment.

This display concept can be extended to the measurement and reproduction of multi-color patterns by sequential measurement of each color and concurrent display of the reproduced colors within the same visual field. It would be possible to create a number of smaller instantaneous fields of view within the right and left display apertures and the different colors could be displayed in parallel concurrently or by multiplexing. A vector of spectral measurements corresponding to the set of colors would be communicated to the consumer Other Display Primaries Technologies In addition to the technologies advocated in a preferred embodiment of the custom display, use of other technologies is within the scope of the presently disclosed method and system, among them, laser diodes, narrowband optical filters, and narrowband phosphors.

Low cost, low power laser diodes potentially can be used as primary sources subject to techniques that assure eye safety as employed in laser-based projectors. Reduced intensities, spoiled spatial and/or temporal coherence, and divergence angle alteration can be used to achieve this objective.

Narrowband color filters can be used with LEDs to establish stable center wavelengths for primaries. If the given LED wavelength varies, the associated filter output center wavelength does not, but output intensity will vary. Then this intensity variation can be compensated by PWM of the LED.

An emerging technology applicable to the presently disclosed method and system comprises narrowband emission phosphors that can have emission spectra bandwidths of 5 to 10 nm. These phosphors can be pumped with broadband excitation. The saturation offered by these phosphors can significantly increase the color gamut of the displays for the present color reproduction application while assuring center wavelength stability.

As discussed below, one approach to minimizing observer metamerism involves use of a multi-primary display with LED wavelengths determined by optimization calculations. To determine the relative intensities of these LEDs that best match the measured article or product spectrum, the method of Murakami et al.

Embodiments That Do Not Require Use of CIE CMFs or Measured Remote User CMFs

Corresponding to the aforementioned third mode of article or product spectrum measurement, there are two chief categories of embodiments that altogether avoid the measurement or employment of remote user CMFs. Each requires the measurement of the reflectance spectrum (as previously discussed) and subsequent filtering of the consumer's ambient lighting with a filter mechanism that uses the reflectance spectrum. In the first such embodiment, specific fixed wavelength transmissive filters are optimally amplitude weighted using the measured reflectance spectrum and employed to filter the user's ambient light. In a second embodiment, spectrum dispersers are used to spread ambient light across an array of intensity modulators that weight each discretized wavelength of light by the associated value of the reflectance spectrum. This spectrally-modulated light then is spatially recombined or despread to produce the article or product color observed with the ambient lighting.

Embodiment Using Fixed Wavelength Filters (Multi Primary Filter)

Figure 12:
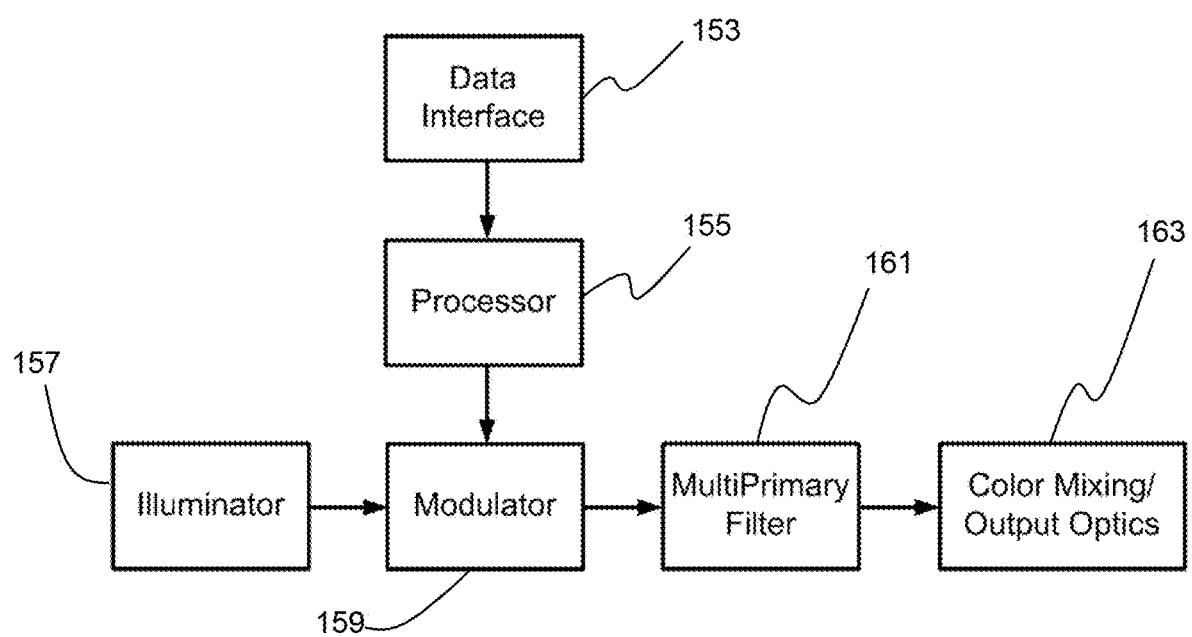
FIG. 12 is a functional block diagram of a color reproduction display device that employs a multiprimary filter.

In this embodiment, the measured reflectance spectrum is approximated by the same weighted set of "N" primary LED wavelengths as determined by the method of Murakami et al. described above. However, instead of using active sources, i.e. LEDs at these primary wavelengths, passive optical filters are used at these wavelengths. Each such filter exhibiting a transmission spectrum that matches the emission spectrum of the corresponding spectrum LED. These filters, when intensity weighted as determined by the aforementioned method of Murakami et al., can be used to reproduce just the reflectance spectrum of the article or product. Such a composite filter then is used to filter the user's ambient light and thereby reproduce the color of the article or product in the user's lighting environment. The intensity weighting of the respective filters is accomplished by external modulation, which effectively can be achieved with the aforementioned DMD technology. FIG. 12 is a functional block diagram of this embodiment wherein an illuminator 157 comprising a constant spectrum light source provides N channels of light with the same spectrum. Each channel of light is given a pre-computed intensity weighting by a modulator 159 such as a DMD. A user interface 153 permits the input of the reflectance spectrum data. A processor 155 uses this data to generate the corresponding drive signals to the modulator 159 so that each channel of light is appropriately intensity modulated. Subsequent to intensity weighting, each channel of light traverses a respective narrow bandpass primary filter of predetermined center wavelength. These N filters comprise the multiprimary filter 161. Each channel of intensity weighted, spectrally-filtered light is spatially combined in the color mixing/output optics 163 in order to present the user with the reproduced article color.

Preferred Embodiment Using Spectrum Dispersers and Spatial Light Modulator

In this embodiment of the device, various alternative mechanisms of spectral dispersion are used in concert with a spatial light modulator such as the DMD discussed above. A DMD-based color reproduction device is one that relies on DMD spatial modulation of spectrally-dispersed light. The DMD is used to temporally modulate pixels of light to achieve different average intensities on a pixel-by-pixel basis. An example of a commercial DMD is the Digital Light Processor (DLP®) manufactured by Texas Instruments in various form factors and pixel densities for use in large screen displays. Upon spectral dispersion of light, DMD pixels can be used to weight the relative intensities of different spectral components of the light.

A DMD-based spectrometer design has been considered for the application of hyperspectral imaging in which each pixel of an image can be selectively filtered at high spectral resolution. (S. P. Love et al., "Full-frame programmable spectral filters based on micromirror arrays," Journal of Micro/Nanolithography, MEMS, and MOEMS, Vol. 13, No. 1, January-March 2014.). Since pixel (micromirror) sizes in the DMD are on the order of microns, the DMD is essentially a two-dimensional diffraction grating and the implications of the associated diffraction effects must be taken into account. This is especially true for the full-frame imaging application addressed by Love et al. The present application is not an imaging one degraded by spectral smearing of an image, but dealing with the existence of DMD diffractive orders remains an issue.

Figure 13:
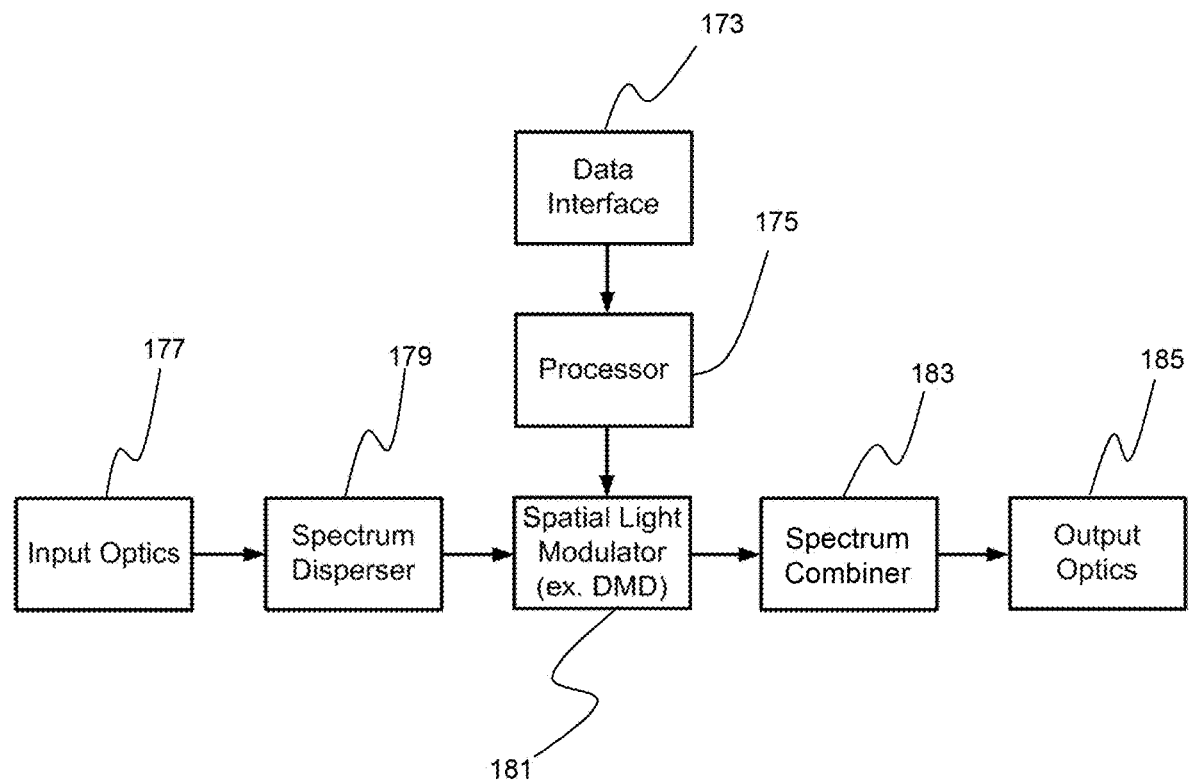
FIG. 13 is a functional block diagram of a color reproduction display device that employs a spectrum disperser and spectrum combiner with a spatial light modulator.

The diffraction efficiency of the DMD will oscillate as a function of wavelength ("DMD Optical Efficiency for Visible Wavelengths," Texas Instruments Application Report, Literature Number: DLPA083A, June 2018-Revised May 2019) as diffraction orders containing the most energy vary from the 24-deg micromirror reflection angle as a function of wavelength. Wavelength dependent spectral distortion caused by this efficiency variation can be compensated in a calibration of the drive signal amplitude (micromirror duty cycle) for each pixel (mirror or set of mirrors) of the DMD mapped to a respective wavelength. This will permit an accurate DMD modulation of the ambient light spectrum by the reflectance spectrum. FIG. 13 is a functional block diagram of this embodiment in which ambient light is introduced to a spectrum disperser 179 by way of input optics 177 which focus and/or collimate the light. The spectrum disperser spatially spreads the different wavelengths of light across a spatial light modulator 181 which intensity modulates each wavelength representative region of the spread light by a value corresponding to the same wavelength of the reflectance spectrum of an article or product. The article or product reflectance spectrum data is input to this device through data interface 173 which introduces this spectral information to processor 175. The spectral information is formatted spatially to correspond to the map of wavelengths spread across the spatial light modulator 181. The light emanating from spatial light modulator 181 is spectrally combined in spectral combiner 183 and the resulting single color light is delivered for human viewing by output optics 185.

Variants of a DMD-based color reproduction device are defined by different mechanisms for spectral dispersion, namely, diffraction, refraction, and interference. The following table summarizes the advantages and disadvantages of these approaches to achieving spectral angle dispersion.

| Characteristics | Prism | Reflective Diffraction Grating | Virtually Imaged Phased Array |
|---|---|---|---|
| Dispersion Principle | Exploits variation in refractive index with wavelength | Exploits reflection from a reflective surface with a regular grating structure | Exploits interference among phase shifted wavefronts |
| Light Efficiency | Broadband high efficiency | Low efficiency across spectrum due to multiple diffraction orders at each wavelength-high efficiency near blaze wavelength | Broadband high efficiency |
| Wavelength Dependency of Dispersion | Nonlinear, highest in the UV, decreases from visible to IR | Large and approximately constant dispersion | Extremely large, but constant dispersion |
| Temperature Dependence of Dispersion | High-large variation in refractive index with temperature | Low-deformation due to temperature | High-large variation in refractive index with temperature |
| Higher-Order Light | None | Yes-requires higher order light cutout filtering | Yes-requires higher order separation |
| Stray Light | Low | High | Low |
| Polarization | Low | High | Low |
| Expense | High for polished glass-lesser expense for molded glass and molded polymer | Low | Low |

Diffraction-Based Variant

Figure 14:
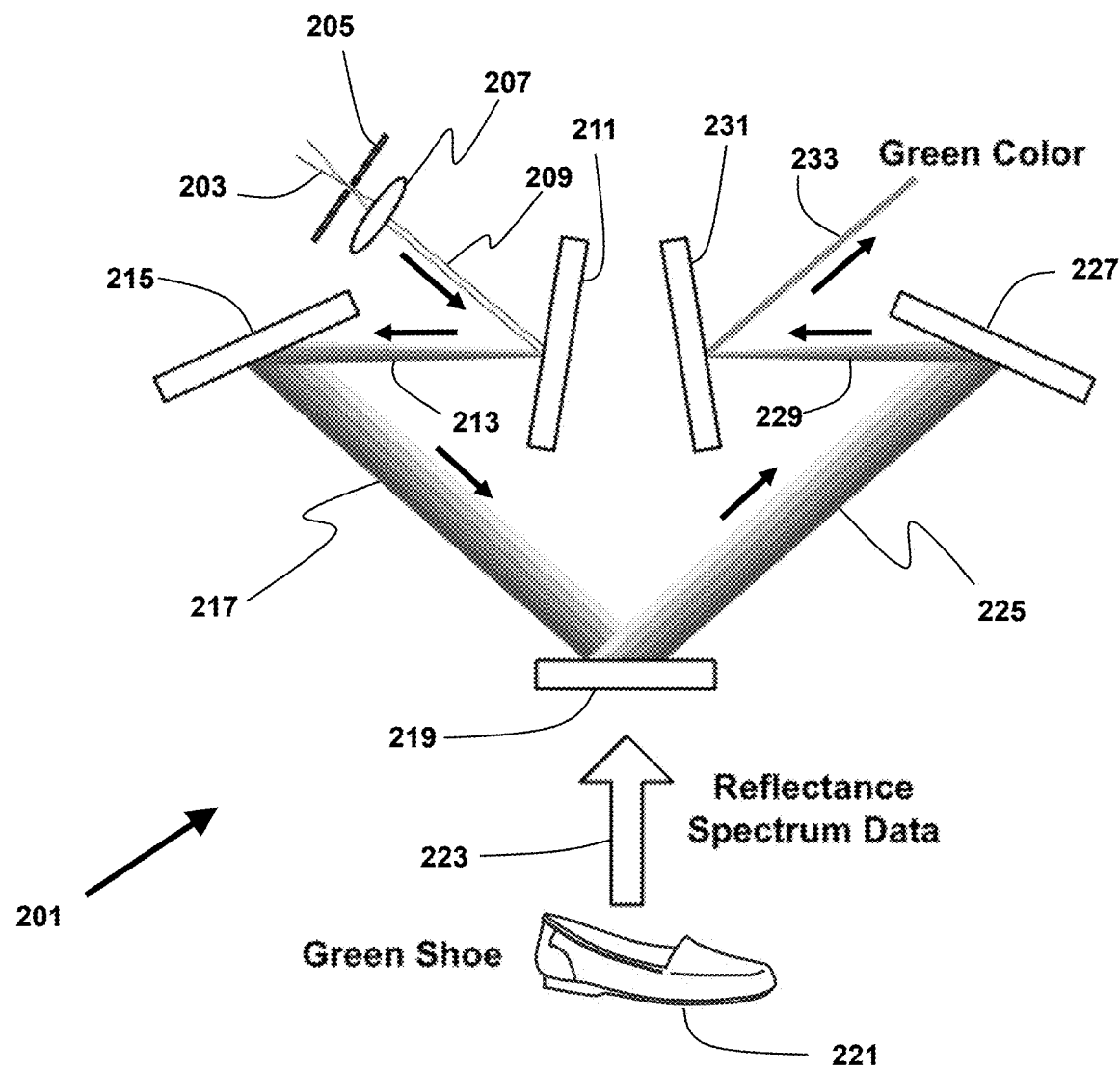
FIG. 14 is a schematic diagram of a color reproduction display device corresponding to the block diagram of FIG. 13 that employs 4 gratings.

Reference is made to FIG. 14, a schematic diagram of the device 201 employing diffractive spectral dispersion. In this design, ambient light 203 is focused onto an entrance slit 205 that imparts spatial coherence to the incoming light. A lens 207 creates a collimated beam of light 209 that impinges a first diffraction grating 211. The resulting spectrally dispersed light 213 is filtered by a linear variable filter (LVF) (not shown), well known in the prior art. The LVF serves to remove higher diffraction orders that would overlap spatially into a single diffraction order. LVF-filtered beam 213 is spectrally dispersed in angle as it is incident a second diffraction grating 215. Grating 215 creates a collimated, spectrally-dispersed beam 217. Each pixel of DMD 219 is used to intensity modulate a respective spectral band in beam 217 with the corresponding value of a reflectance spectrum at this spectral band. The reflectance spectrum of an example green shoe 221 is depicted as an input to DMD 219 by arrow 223. Spectral data input through a user interface is converted (by electronics not shown) to the pixel modulation values loaded into DMD 219. The intensity modulated beam 225 reflected from DMD 219 is incident on a third grating 227 which creates a spectrally recombined beam 229. A fourth and final grating 231 forms a collimated beam 233 of uniform color representing the green shoe 221 as seen in the ambient light. Various modalities for display of this light include beam expansion and frosted translucent surfaces. The optics can be configured to create a one-dimensional spectral spread of the ambient light or a two-dimensional beam exhibiting columns of light, with each column corresponding to a different wavelength band.

Subnanometer spectral resolution is achieved by choice of slit size, grating design parameters and the number of micromirrors in the array of the DMD employed to modulate the light. The density of micromirrors effectively quantizes the wavelengths used to represent the reflectance spectrum over the 360 nm-wide visible band. For applications beyond consumer use requiring higher spectral resolution and or range, a DMD with larger numbers of micromirrors can be used.

Output optics are used to format this light into a region of single color, spatially uniform light for viewing by the human eye. In this way, the consumer uses this device to filter an ambient light source (room lighting, outdoor lighting, desktop illumination, solar light, etc.) of their choice by the actual article or product reflectance spectrum so as to view the actual article or product color in high fidelity in the presence of a given ambient light spectrum. The consumer's eye and brain will respond as though the actual article or product was being viewed in the consumer's chosen ambient light.

Grating spectrometer and grating pulse compressor technologies, well known in the prior art, are directly applicable to this embodiment of the invention. The tradeoffs between using ruled versus holographic diffraction gratings are well known in the prior art and can be assessed in a formal reduction to practice of this invention.

Figure 15:
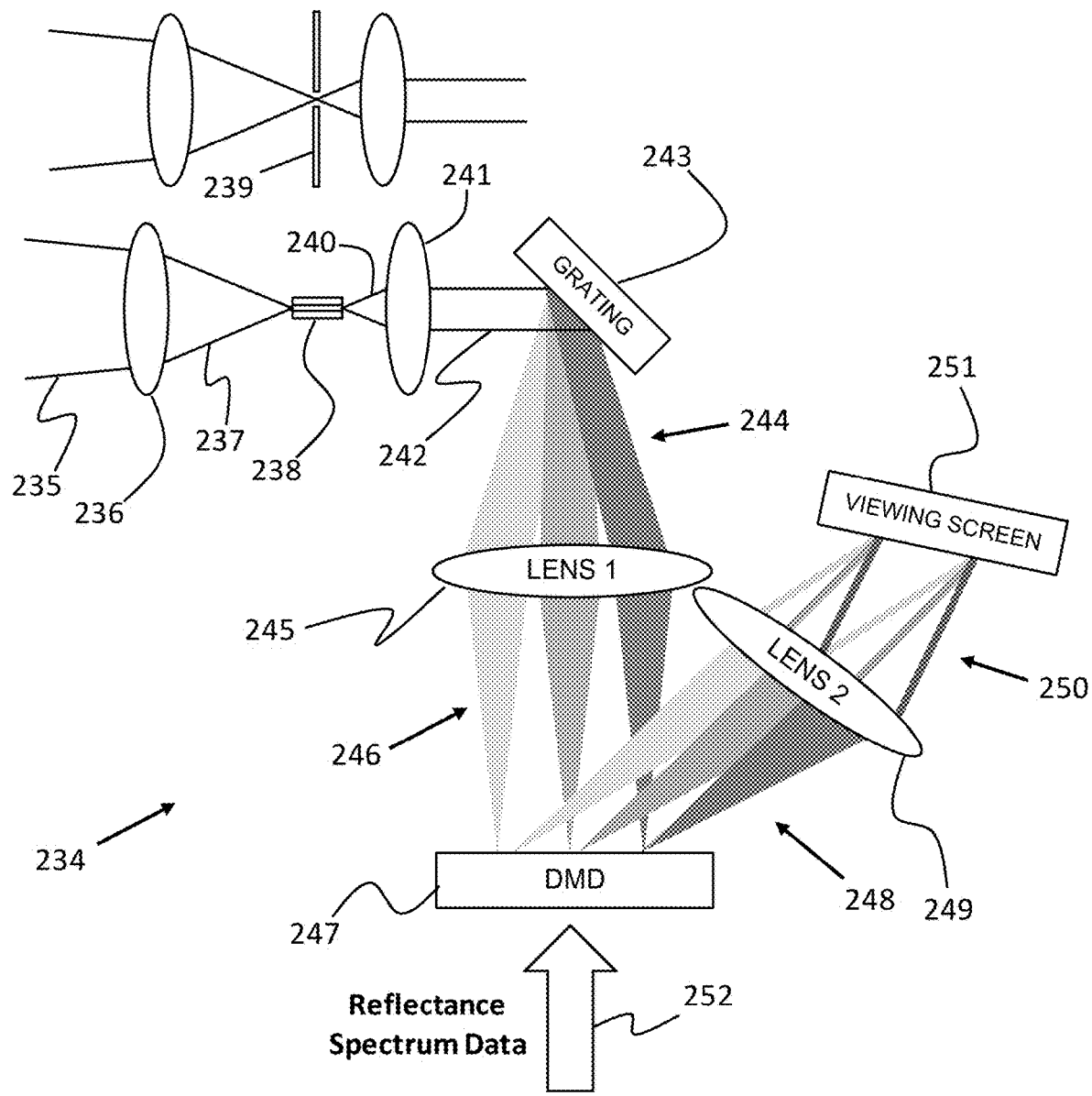
FIG. 15 is a schematic diagram of a color reproduction display device that employs a single reflective or transmissive grating and facilitates high ambient light throughput.

A simplified device 234 which facilitates light throughput while maintaining the resolution of spectral modulation is shown in FIG. 15. Ambient light bundle 235 enters collection optic 236 which provides focused light 237 for introduction to either a fiber 238 or an aperture 239. The light 240 exiting either fiber 238 or aperture or slit 239 enters collimating optic 241 and forms a collimated beam of light 242 which impinges diffraction grating 243. The spectrally-spread, diffracted light bundle 244 enters a first focusing optic 245. For simplicity, light bundle 244 is denoted by just three gray shades, representing only 3 wavelengths rather than the continuum of wavelengths that are actually present. Diffraction grating 243 is approximately one focal length away from first focusing optic 245 to achieve telecentric focusing of light onto DMD 247. Reflectance spectrum data 252 is input to the DMD 247 to govern spectral modulation of the incoming light 246 and thereby produce spectrally-modulated outgoing light 248. The grating 243 is reimaged onto viewing screen 251 using optic 249 ensuring the pupil is imaged onto it. This achieves inherent spectral recombination of the light. As is well known in the prior art, each micromirror of the DMD 247 will intensity modulate the light of a respective small band of wavelengths falling on it as per the programmed data 252 controlling the DMD 247 response. The goal is to independently modulate the light intensity in each wavelength band. By imaging the diffraction grating 243 onto viewing screen 251 with the use of the DMD 247, the output light 250 will comprise spatially mixed wavelengths resulting in a spatially uniform rendition of the intended color at the viewing screen 251. The viewing screen can be a frosted plate of translucent colorless material such as glass or polymer. Variations on this approach include the option to use a slit, pinhole, light pipe or fiber, variation of layout geometry and associated angles, multiple mirrors or lenses to replace a single lens, and a prism in lieu of grating. When using a fiber or round or square aperture, consideration is given to use of cylindrical lenses or mirrors to spread the light out in one axis so that first focusing lens 245 will focus the different wavelengths to lines. Filters can be used to block light input that is outside the desired spectrum. A further consideration is that the diffraction grating can be transmissive or reflective. A transmissive grating could provide a simplified more linear layout. The grating could also be powered (exhibit curvature for focusing) to avoid use of the focusing optic 245.

The following computations illustrate the achievable level of optical throughput for a device of FIG. 15.

Given an input lens with a focal length of $$f = 20 \text{ mm},$$

a distance to a luminous object $$z_0 = 1000 \text{ mm},$$

and an image distance $$z_i = \frac{1}{\frac{-1}{z_0} + \frac{1}{f}} = 20.408 \text{ mm}$$

with a lens diameter $$D = 20 \text{ mm},$$

the resulting F-number is $$F_{num} = \frac{f}{D} = 1$$

and the numerical aperture is $$NA = \sin\left(a\tan\left(\frac{1}{2 \cdot F_{num}}\right)\right) = 0.447$$

The lens has a magnification:

$$mag = \frac{z_i}{z_0} = 0.020408$$

An example luminous object is a 60 watt light bulb which typically emits 800 lumens. Luminous flux $\phi_L=800$ lm and converting to watts:

$$\Phi_W = \frac{\frac{\Phi_L}{\text{lm}}}{683} \cdot W = 1.171 \text{ W}$$

The bulb emitter size is $A_b=(68 \text{ mm})^2$ and the radiance of the bulb estimated below is based on bulb size $$L_s = \frac{\Phi_W}{4 \cdot \pi \cdot A_B} = 20.158 \frac{W}{m^2 sr}$$

Use is made of a large core multimode fiber as the input aperture.

The fiber tip diameter is $h_t=1.5$ mm with the corresponding radius $h_t=0.75$ mm Hence the object radius is $$h_o = \frac{h_t}{mag} = 36.75 \text{ mm},$$

the image area is $A_d=\pi \cdot (h_i)^2=(1.767 \cdot 10^{-6}) m^2,$ and the flux that makes it to focus is $$\Phi_{tE} = L_s \cdot A_d \cdot \left(\pi \cdot \sin\left(atan\left(\frac{\frac{D}{2}}{z_i}\right)\right)\right)^2 = (2.167 \cdot 10^{-5}) W$$

This value of 21.67 microwatts results if there is lossless transmission of light through the optical path. However, there is an associated loss budget totaling 40 percent provided in the following table.

| Element | Transmission |
|---|---|
| lens | 96% |
| fiber in | 96% |
| fiber out | 96% |
| lens | 96% |
| grating | 80% |
| lens | 96% |
| DMD | 80% |
| lens | 96% |
| screen | 80% |
| Total | 40% |

Inclusion of this loss yields a total power output of 8.68 microwatts. If it is assumed that the illuminating radiation is reflected from the surface of a colored article, this power is reduced on average to 20% of this value, yielding 1.74 microwatts. It turns out that that the total amount of light that enters the eye from a desktop display is actually less than a microwatt ("In the Eye of the Beholder—Scanning light beams to the retina could revolutionize displays for everything from cellphones to games," IEEE Spectrum, Volume 41, Issue 5, May 2004, pp. 24-28.). So the device of FIG. 15 can be realized with adequate optical throughput for color visualization.

Figure 16:
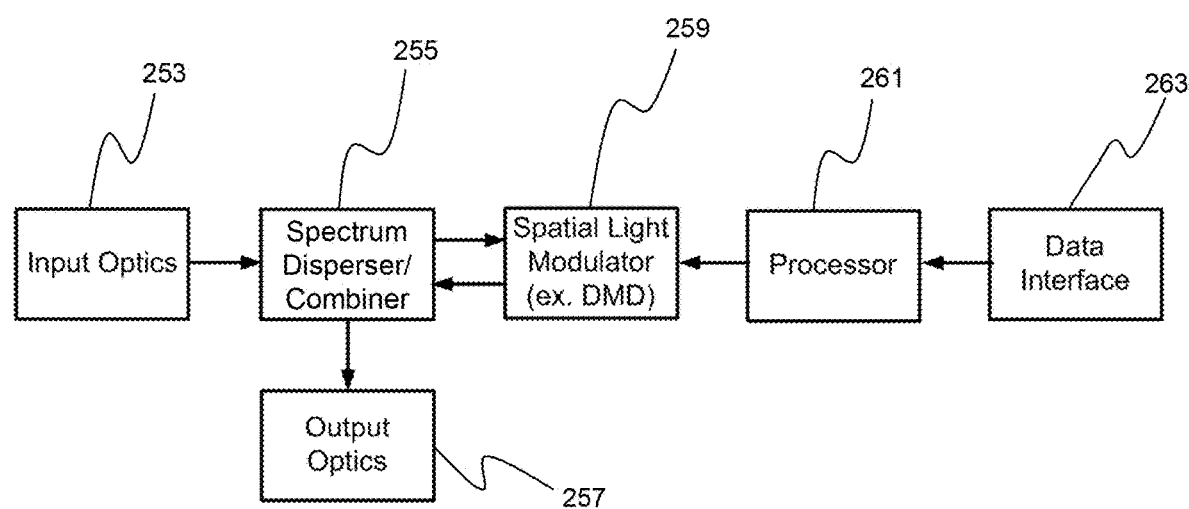
FIG. 16 is a functional block diagram of a color reproduction display device that employs a combined spectrum disperser—spectrum combiner with a spatial light modulator.

FIG. 16 provides a block diagram of a color reproduction device in which the spectrum dispersion and spectral combining are achieved by the same functional element. Herein, light is introduced though input optics 253 to the spectrum disperser/combiner 255 from a given direction. This light is spectrally-dispersed and impinges the DMD 259 from this given direction. It is reflected in the reverse direction and the light reenters spectrum disperser/combiner 255, but is spectrally-recombined for introduction to output optics 257. Data interface 263 and processor 261 convey reflectance spectrum information to the DMD 259.

Figure 17:
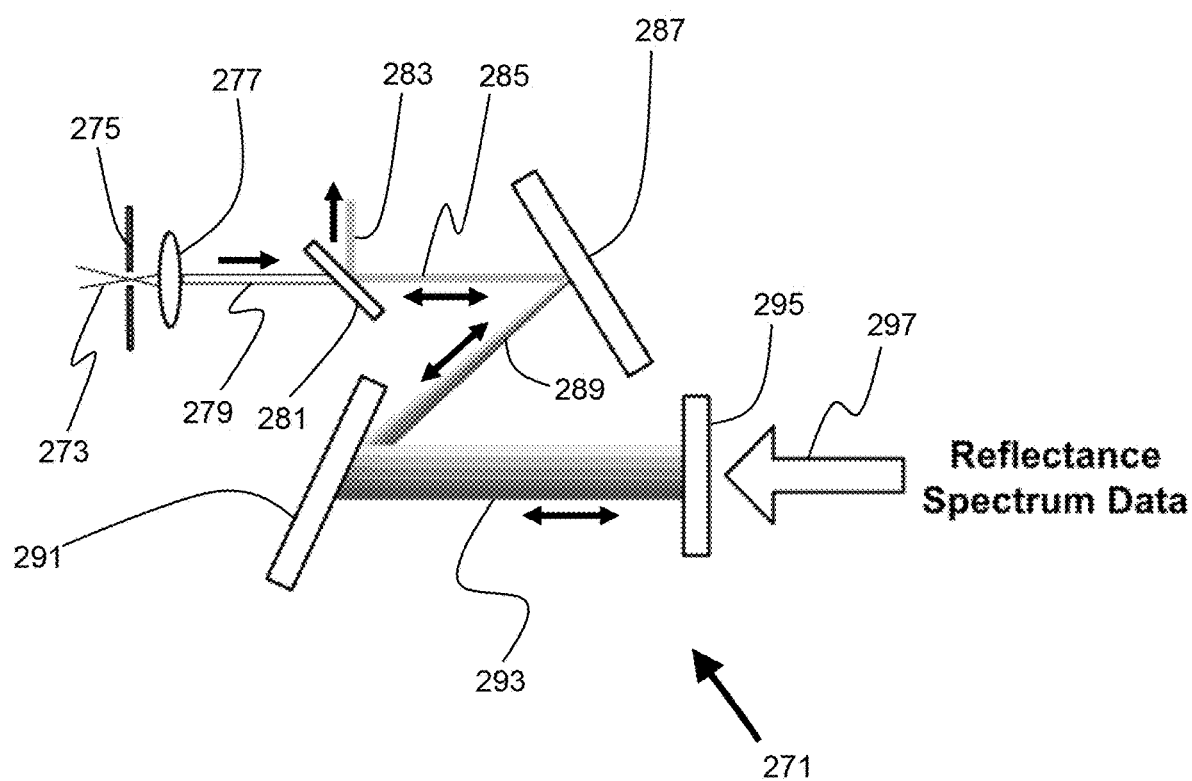
FIG. 17 is a schematic diagram of a color reproduction display device corresponding to the block diagram of FIG. 15 that employs 2 gratings.
Figure 18:
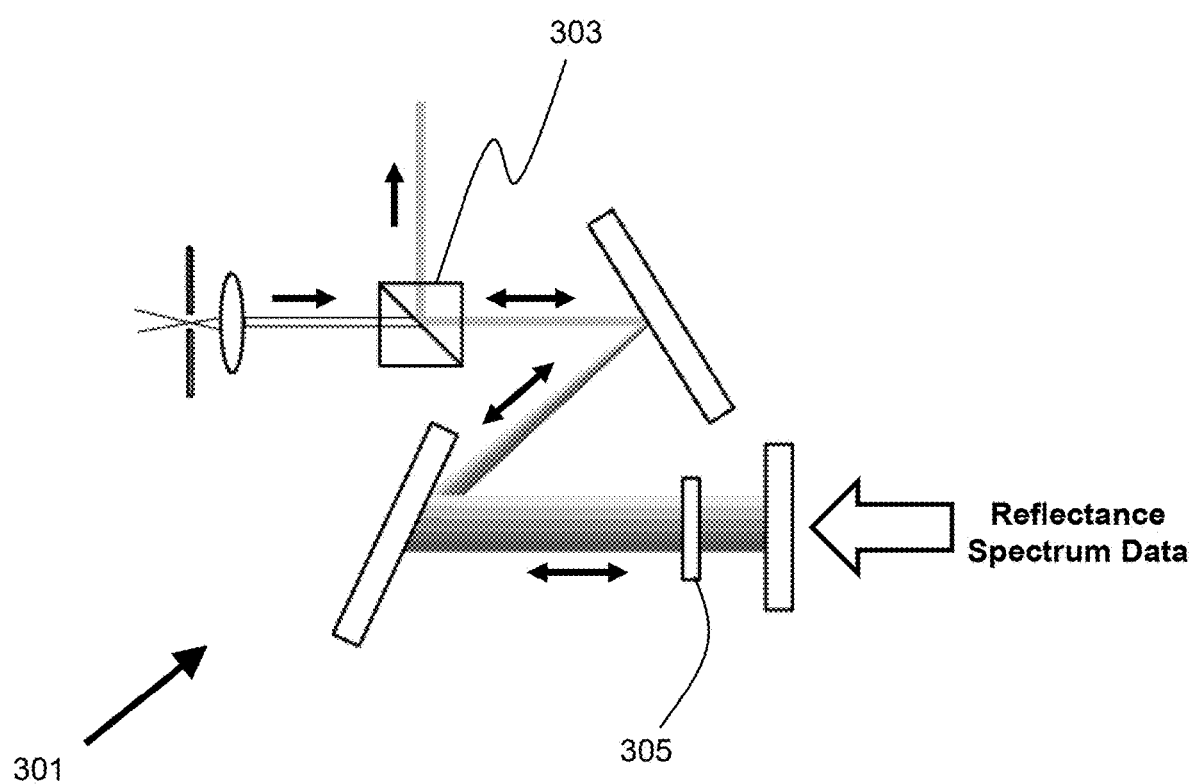
FIG. 18 is a schematic diagram of the color reproduction display device of FIG. 16 but with the inclusion of an optical isolator.

Reference is made to FIG. 17, a pictorial diagram of an alternate grating-based implementation 271 of the block diagram of FIG. 16. Again, input ambient light 273 is focused through slit 275 and introduced to lens 277 to create a collimated beam 279 that traverses a beamsplitter 281. Subsequently, beam 285 is incident on a first diffraction grating 287 which creates spectrally dispersed beam 289 (with the aforementioned LVF not shown). Beam 289 is converted to a collimated beam 293 by a second grating 291. DMD 295 intensity modulates each spectral band of beam 293 in accordance with the reflectance spectrum data represented by arrow 297. It should be pointed out that the DLP® DMD exhibits mirror positions at ±12 degrees for the reflection on and off states, respectively. For simplicity of presentation, FIGS. 16 and following do not depict this angular offset from the perpendicular to the DMD envelope. DMD 295 reflects beam 293 in the reverse direction whereby it undergoes convergence by grating 291 and spectral recombining by grating 287. The ambient light, filtered with the reflectance spectrum is projected along beam 283 for viewing by the user. Given the light loss associated with use of the beamsplitter 281, consideration is given to a method to reduce such loss. This is depicted in the schematic diagram of FIG. 18 which depicts a device 301 incorporating an optical isolator function. This is achieved by a scheme well known in the prior art that uses a combination of a polarizing beamsplitter 303 and wideband quarter wave plate 305. The beam propagates in the first direction with one polarization state and is converted to an orthogonal polarization state for propagation in the reverse direction. The polarization beamsplitter thereby separates the forward and reverse propagating beams. For the two polarization states, s and p, the gratings will have different efficiencies, but there is no polarization-based spectral dispersion so this will not cause spectral distortion.

Refraction-Based Variant

Figure 19:
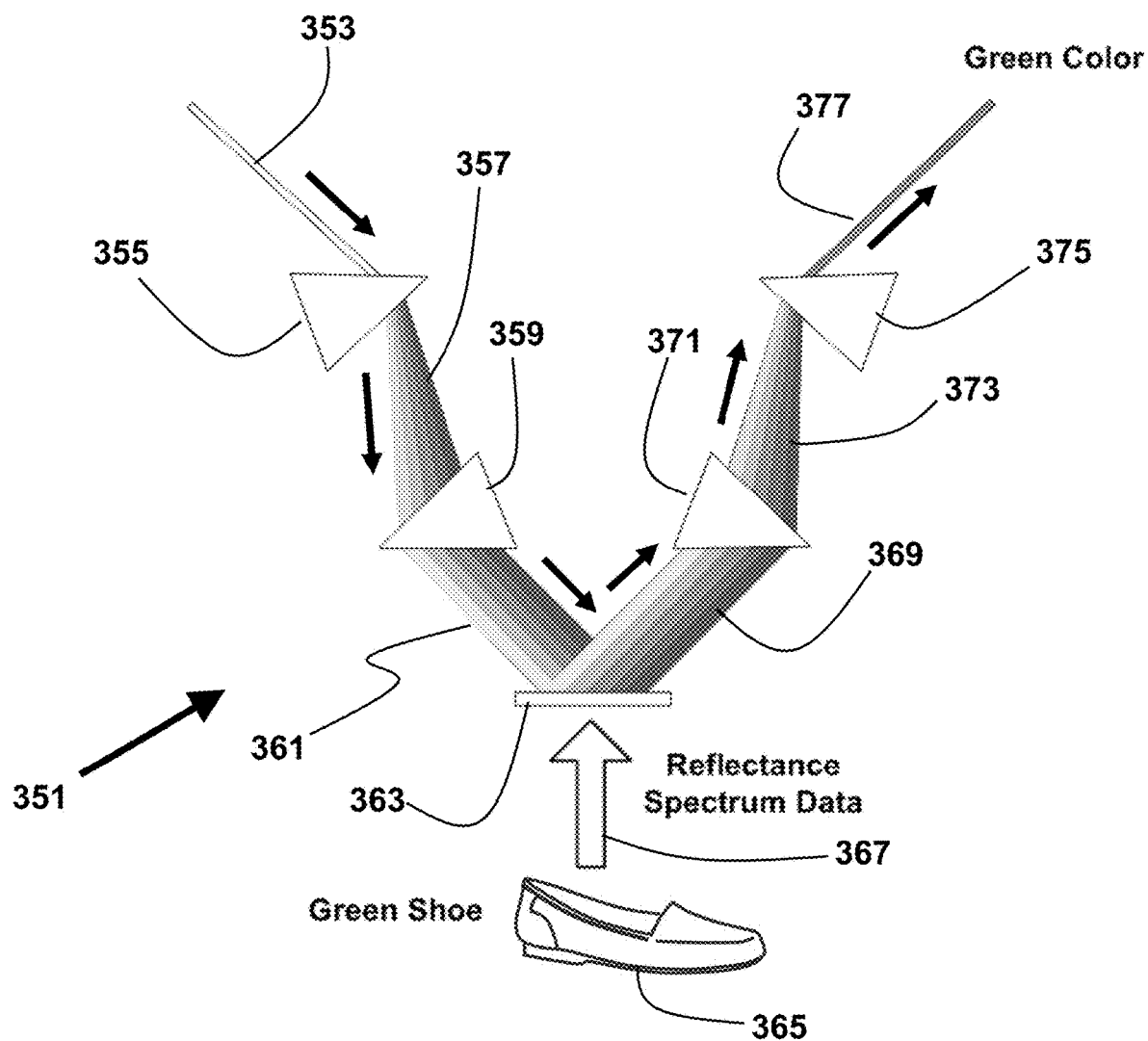
FIG. 19 is a schematic diagram of a color reproduction display device corresponding to the block diagram of FIG. 13 that employs 4 prisms.

A first refraction-based variant of the device using spectrum dispersion is depicted in the schematic diagram of FIG. 19. This device 351 incorporates prisms in lieu of the gratings in the device of FIG. 14. An ambient light beam 353 is introduced to a first prism 355 which creates a spectrally-dispersed beam 357. Prism 359 collimates beam 357 to create beam 361. DMD 363 intensity modulates the spectral bands of beam 361 in accordance with the reflectance spectrum data 367 corresponding to an article 365, such as the green shoe. The reflected, spectrally-dispersed 369 is spatially modulated with an intensity corresponding to each band of the reflectance spectrum. Prism 371 creates a converging beam 373 incident on prism 375 which spatially recombines the spectral components of the beam, thereby creating a beam 377 of uniform color.

Figure 20:
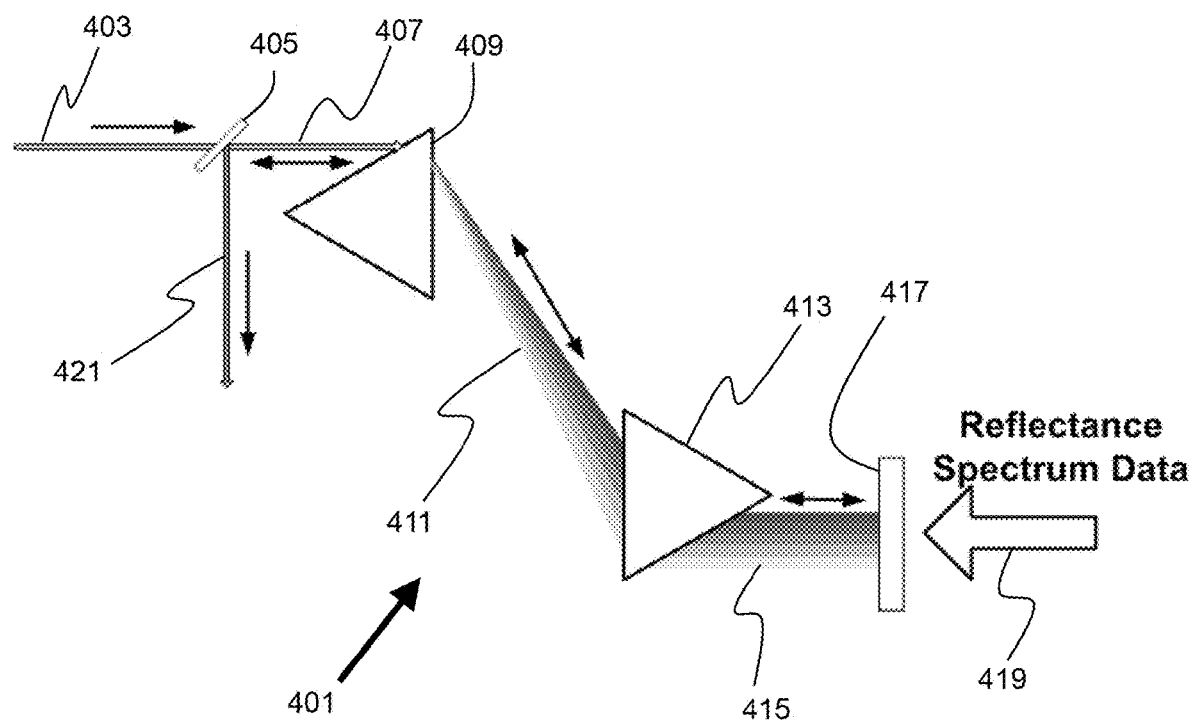
FIG. 20 is a schematic diagram of a color reproduction display device corresponding to the block diagram of FIG. 15 that employs 2 prisms.

A second refraction-based variant of the device is shown in FIG. 20. This device 401 incorporates two prisms in lieu of the two gratings in the device of FIG. 17. An ambient light beam 403 traverses a beamsplitter 405 with the transmitted light proceeding along beam path 407. Prism 409 creates a spectrally-dispersed beam 411 and prism 413 forms collimated beam 415. DMD 417 modulates the beam 415 using reflectance spectrum data 419 and retroreflects the beam so that it retraces its path to the beamsplitter 405 whereupon a single color beam 421 is reflected for user viewing.

Figure 21:
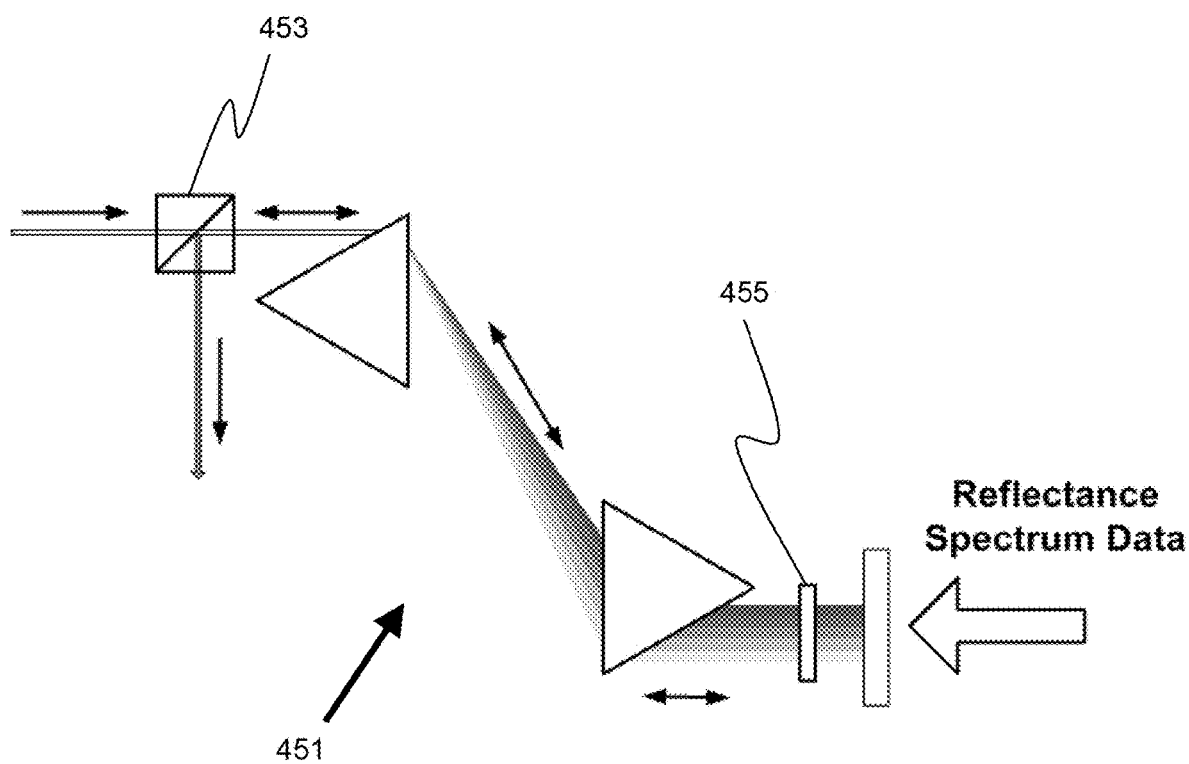
FIG. 21 is a schematic diagram of the color reproduction display device of FIG. 19 but with the inclusion of an optical isolator.

The device 451 of FIG. 21 depicts the additional use of an optical isolator comprising polarization beamsplitter 453 and wideband quarter wave plate 455 to conserve the amount of light useful for color observation.

Figure 22:
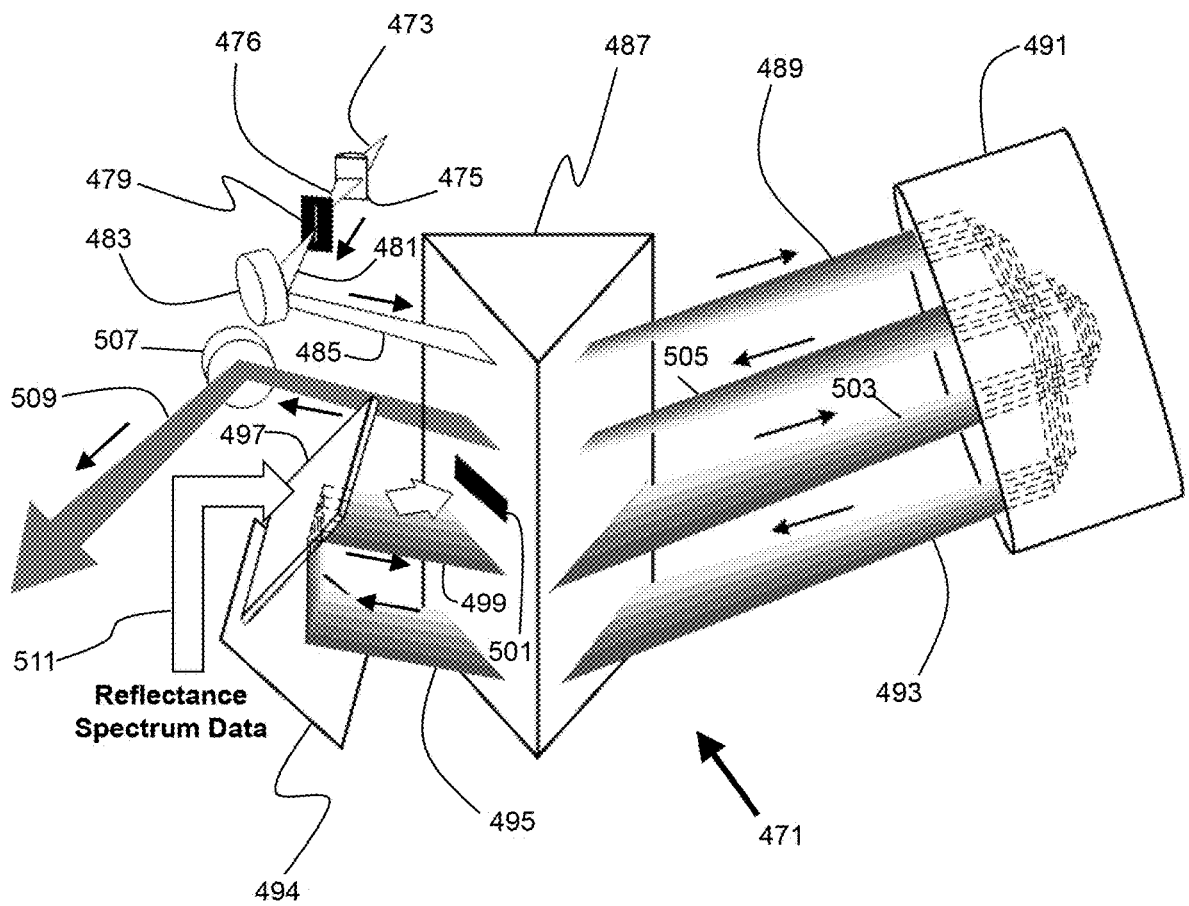
FIG. 22 is a pictorial diagram of a color reproduction display device corresponding to the block diagram of FIG. 15 that employs a single prism.

A compact geometry for a spectral disperser color reproduction device borrows from optical pulse compression technology. This implementation using only one prism is depicted in the pictorial diagram of device 471 in FIG. 22. An ambient light source 473 is focused by lens 475 into a slit 479. The beam 481 exiting slit 479 is reflected from mirror 483 along beam path 485 and is incident on prism 487. Beam 489 exiting prism 487 is spectrally dispersed and is retroreflected by corner cube mirror 491 to form beam 493 that reenters prism 487. Upon exiting prism 487 the beam 495 is collimated and is reflected from mirror 494 onto DMD 497. Each spectral component of beam 495 is intensity modulated by DMD 497 in accordance with the reflectance spectrum data 511. Any rejected light from DMD 497 is captured in a light absorbing beam dump 501 at the face of prism 487. Modulated beam 499 reenters prism 487 and exits as converging beam 503 which is reflected by corner cube mirror 491 to form beam 505 which again reenters prism 487 and results in spectrally recombined beam 509. Mirror 507 reflects single color beam 509 for user viewing of the reproduced article color seen in ambient light.

Interference-Based Variant

This variant of a spectral dispersion color reproduction device exploits a Virtually Imaged Phased Array (VIPA). A succinct description of the VIPA comes from Wikipedia: " . . . the phased array is the optical analogue of a phased array antenna at radio frequencies. Unlike a diffraction grating which can be interpreted as a real phased array, in a virtually imaged phased array the phased array is created in a virtual image. More specifically, the optical phased array is virtually formed with multiple virtual images of a light source. This is the fundamental difference from an Echelle grating, where a similar phased array is formed in the real space. The virtual images of a light source in the VIPA are automatically aligned exactly at a constant interval, which is critical for optical interference. This is an advantage of the VIPA over an Echelle grating. When the output light is observed, the virtually imaged phased array works as if light were emitted from a real phased array."

Figure 23A:
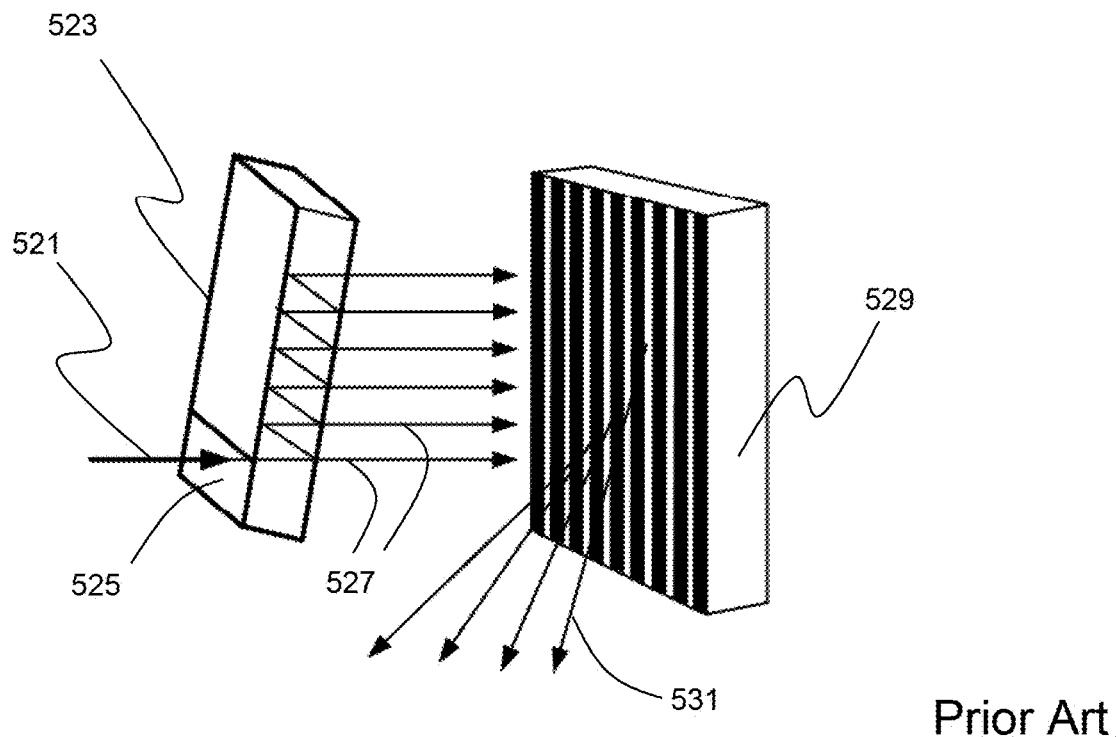
FIG. 23A is pictorial diagram of a VIPA used in concert with a grating.

The VIPA was proposed and named by Shirasaki in 1996. Most recently, in U.S. Pat. No. 10,495,513 to Jean-Ruel et al., a VIPA is disclosed with increased input light coupling efficiency. This device was developed by Light Machinery, Inc. and commercialized in their series of high spectral resolution spectrometers. The operation of a VIPA can be described with reference to an example application in which the VIPA is used in conjunction with a grating to spatially resolve the stabilized frequency comb of a Ti:sapphire femtosecond laser (Diddams et al., "Molecular fingerprinting with the resolved modes of a femtosecond laser frequency comb," Nature, Vol. 445, No. 8, February 2007, pp. 627-630.). FIG. 23A depicts an input beam of light 521 incident to the input aperture 525 of a VIPA 523. The VIPA is essentially a plane-parallel solid etalon, where the input beam (focused to a line) is injected at an angle through an uncoated entrance window on the front face. The remainder of the front face is coated with a high-reflective dielectric coating, while the back face has a dielectric coating with 96% reflectance. The multiple reflections within the VIPA etalon interfere such that the exiting beam 527 has its different frequencies emerging at different angles. As with all etalons, the VIPA has a free spectral range (FSR) determined by its thickness and material index of refraction. The output orders are spatially superimposed on each other. This problem is well known in classical spectroscopy, and has been overcome by using a second dispersive element along an orthogonal spatial dimension. This is depicted in FIG. 23A with grating 529 separating the orders into distinct beams 531.

Figure 23B:
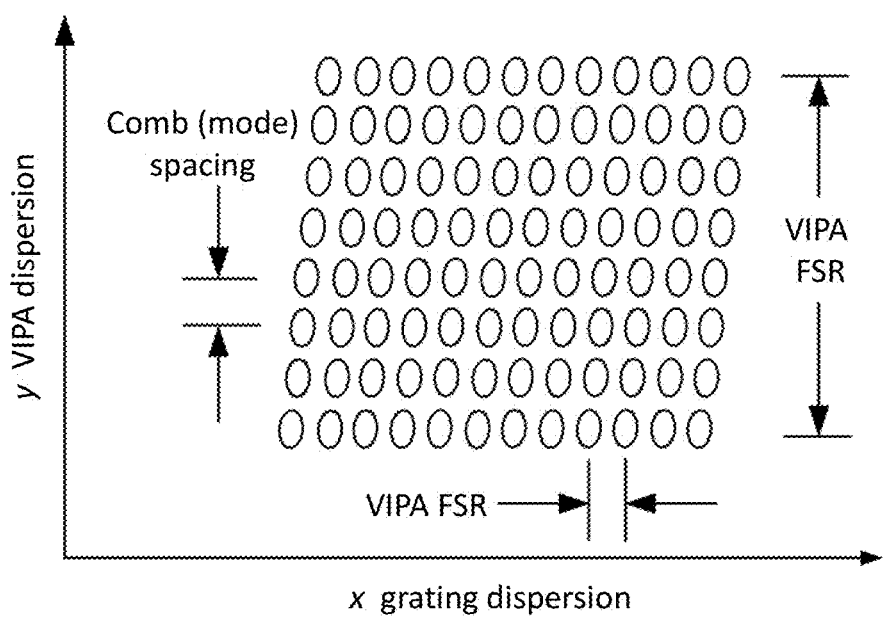
FIG. 23B is a two-dimensional map of the light dispersed by the VIPA-grating combination.

In the example wherein the input comprises radiation from the aforementioned Ti:sapphire femtosecond laser, the output of the VIPA-grating combination consists of a two-dimensional array of the frequency comb modes as depicted in FIG. 23B, where each 'dot' represents an individual mode. Within a column (y), which is tilted by the grating dispersion, the dots are separated by the mode spacing. Within each row (x), the dots are separated by the VIPA free spectral range.

In the present application, the VIPA-grating combination serves as a spectrometer for generating a two-dimensional distribution of spectrum values for ambient light. The (y) axis will exhibit very high resolution spectral samples within the FSR of the VIPA and each column generated by grating dispersion will be a separate spectrally adjacent FSR-wide portion of the spectrum. The reflectance spectrum will be mapped to this geometry in the DMD for appropriately modulating each wavelength bin of the ambient light spectrum. A good guide to the design of VIPAs is found in the reference to Xiao et al. (Xiao et al., "A Dispersion Law for Virtually Imaged Phased-Array Spectral Dispersers Based on Paraxial Wave Theory," IEEE Journal of Quantum Electronics, Vol. 40, NO. 4, April 2004, pp. 420-426.).

Figure 24:
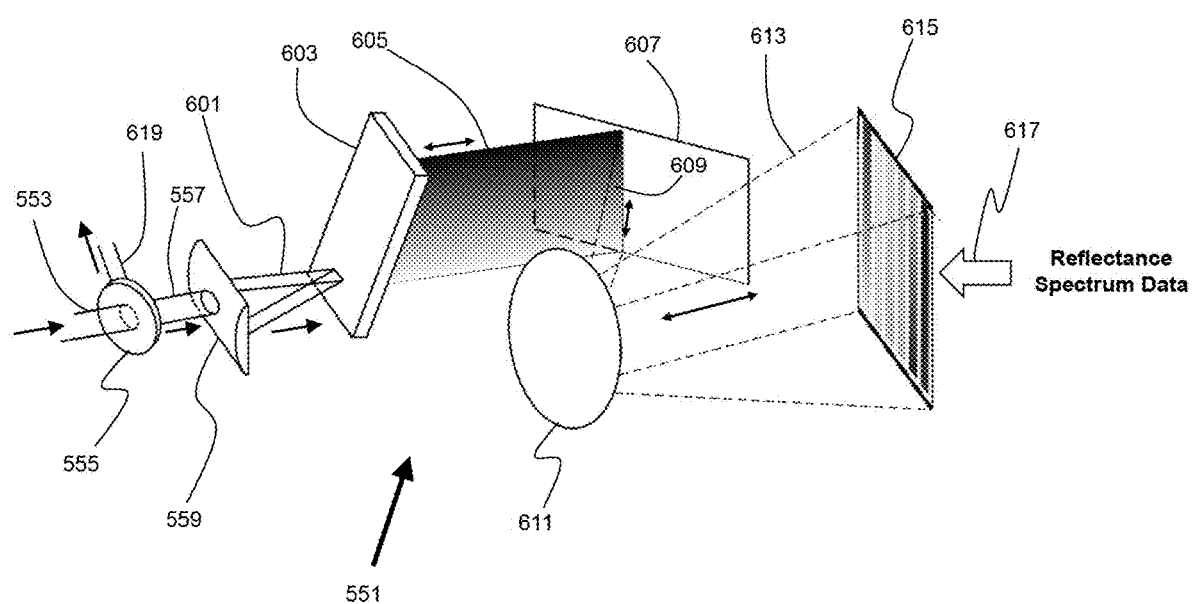
FIG. 24 is a pictorial diagram of a color reproduction display device employing a VIPA and grating.

FIG. 24 is a pictorial diagram of a color reproduction device 551 using a VIPA. Herein an ambient light beam 553 is introduced to beamsplitter 555. The transmitted component 557 enters cylindrical lens 559 which delivers focused beam 601 to the entrance aperture of VIPA 603. Beam 605 exiting the VIPA 603 is spectrally dispersed, but with many overlapping spectral orders. Grating 607 is used to separate these overlapping orders along the cross dimension, resulting in a diverging two-dimensional spectral dispersion of light in beam 609. Mirror 611 focuses beam 609 onto DMD 615 which modulates the beam using reflectance spectrum information 617, as previously discussed, and retroreflects the modulated light. As a result, a single color beam 619 emerges from beamsplitter 555. The optical isolator depicted in previous variants of the color reproduction device also can be used with the VIPA-grating variant of the device to improve light conservation for the user.

Figure 25:
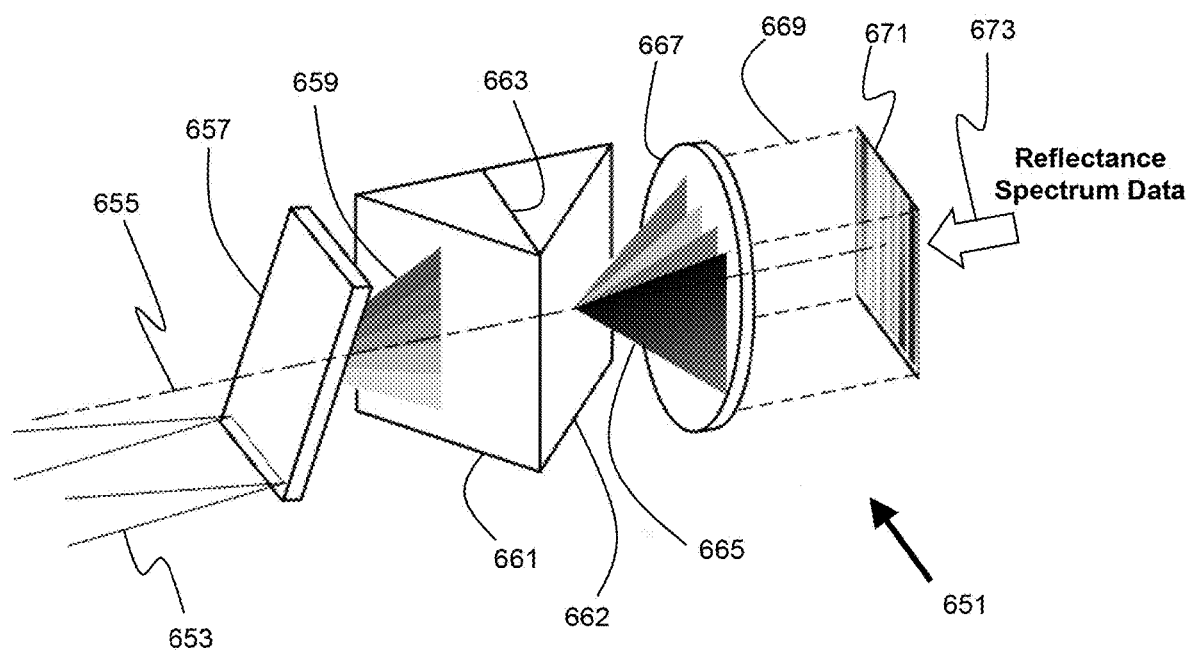
FIG. 25 is a pictorial diagram of color reproduction display device employing a VIPA and GRISM.

A compact spectral disperser has been designed for endoscopic imaging (Metz et al., "Compact, transmissive two-dimensional spatial disperser design with application in simultaneous endoscopic imaging and laser microsurgery," Applied Optics, January 2014, pp. 376-382.) and optimized for high spatial resolution, a small device diameter, and a large field of view. This design is incorporated in the color reproduction device 651 of FIG. 25. Ambient light 653 is focused on the input aperture of VIPA 657. The resulting spectrally-dispersed light exhibiting overlapping orders 659 is introduced to a perpendicularly aligned volume-holographic grating 663, embedded between two prisms 661 and 662 (GRISM). Each FSR portion of the spectrum of this light is fanned out in two dimensions to form beams 665 which focused on the DMD 671 through lens 667. The light is modulated by DMD 671 in accordance with the reflectance spectrum 673 and retroreflected through these optics to a beamsplitter (not shown) for observation of the article color in the ambient light.

Reflected Versus Fluorescent Light

Some surfaces exhibit a combination of reflection and fluorescence so that it appears the reflectance at certain wavelengths is greater than unity due to downconversion of ultraviolet or even visible light. Since a fluorescent material absorbs light over a range of wavelengths with a characteristic excitation range that can reside in the ultraviolet or visible bands, it is necessary to measure the spectral response of the material at each wavelength across the ultraviolet and visible bands. Upon measuring the spectrum of the ambient light that would be used to view an article or product, the complete reflective and fluorescent response can be computed for the material. A normalized complete spectrum then can be displayed with the DMD-based color reproduction device.

Summary of the Methods of the Present Disclosure

The prior description of the devices that support execution of the methods of the present disclosure help to clarify those methods which are summarized below:

- Use a spectrometer to measure the article total spectrum under standard illumination and process the measured spectrum to calculate the drive signals for a multi-primary display using spectral match optimization under CIE or remote user CMF constraint. Publish this drive signal information for remote reproduction on a multi-primary display.
- Use a spectrometer to measure the article or product total spectrum and the illumination spectrum and process the spectral data to produce a reflectance spectrum. Publish the reflectance spectrum information. Measure the ambient illumination spectrum in the remote user's environment. Combine this spectrum with the reflectance spectrum and process the resulting spectrum to calculate the drive signals for a multi-primary display using spectral match optimization under CIE or remote user CMF constraint.
- Use a spectrometer to measure the article total spectrum under standard illumination. Publish the total spectrum information. Measure the remote user's CMFs. Filter the published spectrum information with the remote user's CMFs. Display resulting tristimulus values on an RGB display.
- Use a spectrometer to measure the article total spectrum and the illumination spectrum and process the spectral data to produce a reflectance spectrum. Publish the reflectance spectrum information. Measure the ambient illumination spectrum in the remote user's environment. Combine this spectrum with the reflectance spectrum. Measure the remote user's CMFs. Filter the combined spectrum information with the remote user's CMFs. Display resulting tristimulus values on an RGB display.
- Use a spectrometer to measure the article total spectrum under standard illumination. Publish the total spectrum information. Measure the remote user's CMFs. Filter the published spectrum information with the measured remote user's CMFs to produce tristimulus values. Calibrate the remote user's display with the remote user's measured CMFs. Display the color produced by the tristimulus values on the remote user's CMF-calibrated display.
- Use a spectrometer to measure the article total spectrum under standard illumination. Publish the total spectrum information. Measure the remote user's CMFs. Filter the published spectrum information with the measured remote user's CMFs to produce tristimulus values. Display the color produced by the tristimulus values on a custom RGB display.
- Use a spectrometer to measure the article total spectrum and the illumination spectrum and process the spectral data to produce a reflectance spectrum. Publish the reflectance spectrum information. Measure the ambient illumination spectrum in the remote user's environment. Combine this spectrum with the reflectance spectrum. Measure the remote user's CMFs. Filter the combined spectrum information with the measured remote user's CMFs to produce tristimulus values. Display the color produced by the tristimulus values on the remote user's CMF-calibrated display.
- Use a spectrometer to measure the article total spectrum and the illumination spectrum and process the spectral data to produce a reflectance spectrum. Publish the reflectance spectrum information. Measure the ambient illumination spectrum in the remote user's environment. Combine this spectrum with the reflectance spectrum. Measure the remote user's CMFs. Filter the combined spectrum information with the measured remote user's CMFs to produce tristimulus values. Display the color produced by the tristimulus values on a custom RGB display.
- Use a smartphone camera to display a scene, object, or color checker pattern and adjust the hues of the smartphone display to match the hues of the actual scene, object, or color checker pattern. Use the resulting display calibration data and the camera spectral responsivity to determine the user's CMFs. Import the vendor-provided article or product spectrum data and filter it with the user's CMFs and display the reproduced article or product color associated with the CMF-filtered article or product spectrum.
- Use a spectrometer to measure the article total spectrum and the illumination spectrum and process the spectral data to produce a reflectance spectrum. Using the set of primary filters at wavelengths chosen to minimize metamerism, perform a spectral match optimization under CIE or remote user CMF constraint to determine the primary filter weights. Publish these filter weights for remote reproduction of the reflectance spectrum implemented with spectral filters. Use the intensity weighted spectral filters to filter the remote user's ambient lighting to reproduce article color in a viewer.
- Use a spectrometer to measure the article total spectrum and the illumination spectrum and process the spectral data to produce an article reflectance spectrum. Publish the reflectance spectrum information. Use a spectrum disperser—digital micromirror device to filter the remote user's ambient light with the reflectance spectrum for presentation of article color in the remote user's ambient light.

Those skilled in the art will understand that a number of variations may be made in the disclosed embodiments to articulate other variants of designs, all without departing from the scope of the invention, which is defined solely by the appended claims.

The invention claimed is:

1. A device configured to remotely reproduce the color spectrum of an article or product, the device comprising:
   a. input means configured for receiving spectral information of an article or product obtained at a location remote from the device,
   b. an ambient light collector,
   c. a spectrum disperser configured to create a spatially dispersed spectrum of ambient light collected by the ambient light collector,
   d. a spatial light modulator configured to intensity modulate the spatially dispersed spectrum with an article or product reflectance spectrum to create a composite spectrum,
   e. electronics configured to convert the input article or product spectral information into drive signals for the spatial light modulator,
   f. focusing optics configured to focus the spatially dispersed spectrum onto the spatial light modulator,
   g. a spectrum combiner configured to spatially recombine the spectrally-dispersed, composite spectrum to provide a single color and
   h. a viewing screen located remote from the article or product configured to provide color display to a user.

2. A device for remote reproduction of article or product color spectrum, as recited in claim 1, wherein the ambient light collector comprises:
   a. a first optic for focusing ambient light into an aperture
   b. the aperture taken from the group comprising:
      i. an optical fiber and
      ii. an aperture,
   c. a second optic for collimating the light exiting the aperture, and wherein the spectrum disperser comprises a grating, the spatial light modulator comprises a digital micromirror device (DMD), and the spectrum combiner comprises an optic.

3. A device for remote reproduction of article or product color spectrum, as recited in claim 2, wherein the grating optic includes a curved surface exhibiting focusing power so that focusing optics capable of focusing the spatially dispersed spectrum onto the DMD are inherently part of the grating.

4. A device for remote reproduction of article or product color spectrum, as recited in claim 1, the device wherein the spectrum disperser comprises a first set of two prisms or gratings in tandem that are capable of accepting an input ambient light beam and outputting a collimated, spectrally-dispersed light, and the spectrum combiner comprises a second set of two prisms or gratings in tandem that is capable of accepting as input the collimated spectrally-dispersed light and outputting a spectrally recombined beam.

5. A device for remote reproduction of article or product color spectrum, as recited in claim 1, wherein the spectrum disperser and spectrum combiner are the same element further comprising a first and second prism or first and second grating, wherein light is spectrally dispersed upon traversing the first and then the second prism or grating and is spectrally recombined upon traversing the second and then the first prism or grating.

6. A device for remote reproduction of article or product color spectrum, as recited in claim 1, wherein the spectrum disperser and spectrum combiner are the same element further comprising a single prism, wherein light is spectrally dispersed upon traversing the prism in a first direction and is spectrally recombined upon traversing the prism in a direction reverse to the first direction.

7. A device for remote reproduction of article or product color spectrum, as recited in claim 1, wherein the spatial light modulator comprises a digital micromirror device.

8. A device for remote reproduction of article or product color spectrum, as recited in claim 1, wherein the spectrum disperser and spectrum combiner are the same element further comprising in combination a virtually imaged phased array (VIPA) and a grating, wherein light is spectrally dispersed upon traversing the combination of VIPA and grating in a first direction and is spectrally recombined upon traversing the VIPA and grating in a direction reverse to the first direction.

9. A device for remote reproduction of article or product color spectrum, as recited in claim 1 which includes a polarization beamsplitter and a quarter wave plate capable of increasing device light throughput.

10. A device configured to remotely reproduce the color spectrum of an article or product, the device comprising:
   a. an input interface configured to receive data representing a reflectance spectrum of an article or product obtained at a location remote from the device;
   b. a multi-primary light source comprising at least four emitters of distinct wavelength bands;
   c. drive electronics configured to determine and apply drive signals to the emitters such that a combined spectral output approximates the reflectance spectrum of the article or product with minimized observer metamerism relative to a tristimulus-only match; and
   d. color mixing optics configured to combine light from the emitters into mixed output light for viewing by a user remote from the article or product.

* * * * *